(12) United States Patent
Queen et al.

(10) Patent No.: US 11,857,945 B2
(45) Date of Patent: Jan. 2, 2024

(54) COMPOSITES FOR EXTRACTION OF METAL OR CONTAMINATING CHEMICAL SPECIES

(71) Applicant: ECOLE POLYTECHNIQUE FEDERALE DE LAUSANNE (EPFL), Lausanne (CH)

(72) Inventors: Wendy Lee Queen, Grimisuat (CH); Daniel Teav Sun, Concord, CA (US)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 17/648,219

(22) Filed: Jan. 18, 2022

(65) Prior Publication Data
US 2022/0168706 A1   Jun. 2, 2022

Related U.S. Application Data

(62) Division of application No. 16/639,839, filed as application No. PCT/IB2018/056216 on Aug. 17, 2018, now abandoned.
(Continued)

(51) Int. Cl.
*B01J 20/26* (2006.01)
*B01D 53/02* (2006.01)
(Continued)

(52) U.S. Cl.
CPC ............ *B01J 20/265* (2013.01); *B01D 53/02* (2013.01); *B01D 53/64* (2013.01); *B01D 53/81* (2013.01);
(Continued)

(58) Field of Classification Search
CPC .... B01J 20/265; B01J 20/226; B01J 20/3272; B01D 53/02; B01D 53/64; B01D 53/81;
(Continued)

(56) References Cited

U.S. PATENT DOCUMENTS

2008/0227634 A1*  9/2008  Muller ................. B01J 20/3278
                                                        502/402
2019/0046955 A1*  2/2019  Britt ........................ C02F 1/281
(Continued)

FOREIGN PATENT DOCUMENTS

CN         106076242 A        11/2016
WO     WO 2016/191802        12/2016
(Continued)

OTHER PUBLICATIONS

Zhang et al. "Polydopamine-reinforced magnetization of zeolitic imidazolate framework ZIF-7 for magnetic solid phase extraction of polycyclic aromatic hydrocarbons from the air-water environment" Journal of Chromatography A. 1452 (2016) 18-26 (Year: 2016).*
(Continued)

*Primary Examiner* — Andrew J. Oyer
(74) *Attorney, Agent, or Firm* — NIXON & VANDERHYE

(57) ABSTRACT

Disclosed is the use of a composite for extracting one or more metal or contaminating chemical species from an aerial or aqueous medium by selective binding, the composite including at least one porous template functionalized by at least one polymer, the polymer including one of the following chemical functions: primary, secondary or tertiary amine, amide, nitrile, pyridine, pyrole, thiol, thiolether, thiophene, thiadiazole, alcohol/hydroxyl, phenol, catechol, pyragalol, carboxylic acid, aldehyde, ester, acyl, crown ether, phosphate, phosphoryl, epoxide, halogen, haloalkane.

20 Claims, 21 Drawing Sheets

Related U.S. Application Data

(60) Provisional application No. 62/547,988, filed on Aug. 21, 2017.

(51) Int. Cl.

| | |
|---|---|
| *B01D 53/64* | (2006.01) |
| *B01D 53/81* | (2006.01) |
| *B01J 20/22* | (2006.01) |
| *C02F 1/28* | (2023.01) |
| *C02F 1/70* | (2023.01) |
| *B01D 53/62* | (2006.01) |
| *C02F 101/20* | (2006.01) |
| *C02F 101/22* | (2006.01) |
| *C02F 103/08* | (2006.01) |

(52) U.S. Cl.
CPC ............ *B01J 20/226* (2013.01); *C02F 1/288* (2013.01); *C02F 1/70* (2013.01); *B01D 53/62* (2013.01); *B01D 2253/204* (2013.01); *B01D 2253/25* (2013.01); *B01D 2257/106* (2013.01); *B01D 2257/2025* (2013.01); *B01D 2257/406* (2013.01); *B01D 2257/504* (2013.01); *B01D 2257/708* (2013.01); *B01D 2258/06* (2013.01); *C02F 1/285* (2013.01); *C02F 2101/20* (2013.01); *C02F 2101/22* (2013.01); *C02F 2103/08* (2013.01)

(58) Field of Classification Search
CPC ............ B01D 53/62; B01D 2253/204; B01D 2253/25; B01D 2257/106; B01D 2257/2025; B01D 2257/406; B01D 2257/504; B01D 2257/708; B01D 2258/06; B01D 2257/2045; C02F 1/288; C02F 1/70; C02F 1/285; C02F 2101/20; C02F 2101/22; C02F 2103/08; Y02C 20/40

See application file for complete search history.

(56) References Cited

U.S. PATENT DOCUMENTS

| | | | |
|---|---|---|---|
| 2020/0102410 A1* | 4/2020 | Kirchhoff | ............... C02F 1/26 |
| 2023/0101316 A1* | 3/2023 | Thompson, III | ........ C02F 1/285 |
| | | | 210/502.1 |

FOREIGN PATENT DOCUMENTS

| | | |
|---|---|---|
| WO | WO 2017/133324 | 8/2017 |
| WO | WO 2017/184991 | 10/2017 |

OTHER PUBLICATIONS

U.S. Appl. No. 16/639,839, filed Feb. 18, 2020.

International Search Report issued in International Patent Application No. PCT/IB2018/056216, dated Nov. 7, 2018.

Daniel T. Sun et al.: "Rapid. Selective Heavy Metal Removal from Water by a Metal-Organic Framework/Polydopamine Composite", ACS Central Science, vol. 4. No. 3. Mar. 14, 2018 (Mar. 14, 2018), pp. 349-356. XP055509352, ISSN: 2374-7943, DOI: 10.1021/acscentsci.7b00605 the whole document.

Written Opinion issued in International Patent Application No. PCT/IB2018/056216, dated Nov. 7, 2018.

Alsbaiee, A. et al., "Rapid removal of organic micropollutants from water by a porous beta-cyclodextrin polymer," Nature, vol. 529, Jan. 14, 2016.

Das, N., "Recovery of precious metals through biosorption—A review," Hydrometallurgy 103 (2010) 180-189.

Frankham, J. and Kauppinen, P., "The Use of Metal Scavengers for Recovery of Precious, Base and Heavy Metals from Waste Streams," Platinum Metals Rev., 2010, 54, (3), 200-202.

Zhang, S. et al., "Polydopamine-reinforced magnetization of zeolitic imidazolate framework ZIF-7 for magnetic solid-phase extraction of polycyclic aromatic hydrocarbons from the air-water environment," Journal of Chromatography A 1452 (2016).

* cited by examiner

COMPOSITES FOR EXTRACTION OF METAL OR CONTAMINATING CHEMICAL SPECIES

BACKGROUND OF THE INVENTION

The invention concerns new composites for extracting metals, typically precious metals, and other contaminating chemical species from aerial or aqueous environments, preferably from aqueous mediums such as the oceans, rivers, or waste streams produced by various industries such as the electronics, electroplating, and pharmaceuticals industry.

Industry uses a number of processes that require the use of a variety of different metals, many of which are discharged into aqueous environments. In many cases, these metals (i.e. mercury (Hg) or lead (Pb)) can have toxic effects on the body and environment making it important to extract them from water to inhibit human exposure.

Other metals, particularly those with very low natural abundance, have high economic value, (i.e. gold (Au), silver (Ag), platinum (Pt), and palladium (Pd)) making extraction imperative for recycling purposes. Precious metals are used in a variety of applications that include manufacturing of fine jewelry, electroplating, electronics, pharmaceuticals, and much more.

Many methods, including chemical precipitation, chemical coagulation, electrochemical technologies, ion exchange, and membrane technologies, can be used to extract metals from the wastewater that results from industrial activities. However, these methods suffer from many disadvantages including the need for large quantities of chemical additives forming by-product sludges, high energy usage, high cost and their poor efficiency at very low metal concentrations.

Resins such as Smopex® or Superlig® are quite expensive. Moreover, overtime, large organic molecules such as humic acid typically clog the pores of large pore resins. Often, selectivity to other ions, such as Ca and Mg, is a big problem associated to these ion-exchange resins.

Sustainable metal recovery technologies are mentioned in the publication «*recovery of precious metals through biosorption—A review*». Hydrometallurgy, 2010, 103, 2236. Compared with the previously listed conventional methods, biosorption-based processes disclosed in this publication offer a number of advantages including low operating costs, minimization of the volume of chemical and high efficiency in detoxifying effluents, but these methods also have many disadvantages. Indeed, the use of freely suspended microbial biomass has disadvantages that include small particle size, low mechanical strength and difficulty in separating the biomass and effluent. Moreover, since biosorption is determined by equilibrium, it is largely influenced by pH, by the concentration of biomass and by the interactions between different metallic ions. The biosorption process mechanism is thus complex.

Chemical species different from metals, for example volatile organic compounds (VOCs), may also need to be extracted from their environment which could be an aerial or an aqueous medium.

The object of the present invention is to provide compounds for extracting one or more metal or contaminating chemical species from its environment that overcomes, at least in part, the aforementioned disadvantages.

The present invention typically concerns the extraction of such species from both aerial and aqueous environments, preferably from aqueous environments.

In particular, the ability to remediate to low concentrations of a desired chemical specie in the presence of high concentrations of undesirable chemical species coupled with high removal capacity and fast removal rate are important properties required for materials to be applicable in chemical separations.

Limiting the cost of these compounds is also an objective of the present invention.

The ultimate goal aimed at developing materials that can be precisely designed with varying surface functionality, for the extraction of specific metal or contaminating chemical species from different predefined sources including aerial and aqueous mediums, and typically aqueous mediums including wastewaster mixtures resulting from various industries.

General Description

For this purpose, the invention proposes a composite for extracting one or more metal or contaminating chemical species from an aerial or aqueous medium by selective binding, said composite comprising at least one porous template functionalized by at least one polymer, said polymer comprising one of the following chemical functions: primary, secondary or tertiary amine, amide, nitrile, pyridine, pyrrole, thiol, thiolether, thiophene, thiadiazole, alcohol/hydroxyl, phenol, catechol, pyragallol, carboxylic acid, aldehyde, ester, acyl, crown ether, phosphate, phosphoryl, epoxide, halogen and haloalkane. Preferably, said medium is an aqueous medium.

Advantageously, said at least one polymer is chosen among redox active polymers, peptides, biopolymer including polypeptides and polysaccharides, epoxy based polymer, fluoropolymer, acrylics, dedrimers, rubbers, inorganic polymers and organic polymers. Preferably, said at least one polymer is a redox active polymer.

In the context of this invention, a "redox active polymer" is defined as a polymer that can undergo electron transfer reactions with other chemical species. Redox polymers contain electrostatically and spatially localized redox sites which can be oxidized or reduced, and the electrons are transported by an electron exchange reaction (electron hopping) between neighboring redox sites if the seg-mental motions enable this. Redox polymers can be divided into several subclasses:

Polymers that contain covalently attached redox sites, either built into the chain, or as pendant groups; the redox centers are mostly organic or organometallic molecules; and Ion exchange polymeric systems (polyelectrolytes) where the redox active ions (mostly complex compounds) are held by electrostatic binding.

In the present invention, redox active polymers are preferably chosen among the followings: Poly(Tetracyanoquinodimethane) (PTCNQ), Poly(Viologens) Poly(Tetrathiafulvalene) (PTTF), Quinone Polymers, Polyhydroquinone (PHQ), Polydopamine (PDA), Polytyramine (PTA), Poly-para-phenylediamine (PpPDA), Poly(Vinylferrocene) (PVF or PVFc) (Organometallic Redox Polymer), Perfluorinated Sulfonic Acids (Nafion®), Poly(Styrene Sulfonate) (PSS), Poly(4-vinylpyridine) (PVP, QPVP), Polyaniline (PANI) and PANI Derivatives, Poly(1-,aminoanthracene), Poly(o-toluidine), Poly(1,8-diaminonaphthalene) (PDAN), Poly (aniline-co-N-propanesulfonic acid-aniline), Poly(Diphenylamine) (PDPA), Poly(2-Aminodiphenylamine) (P2ADPA), Poly(o-Phenylenediamine) (PPDA), Poly(o-Aminophenol) (POAP), Polyluminol (PL), Polypyrrole (PP)

and PP Derivatives, Polyindole and Derivatives, Polymelatonin (PM), Polyindoline, Polycarbazoles (PCz), Polythiophene (PT) and PT Derivatives, Polyazines, Poly(1-Hydroxyphenazine) (PPhOH), Poly(Acridine Red) (PAR), Poly (Phenosafranin) (PPhS), Polyflavin (PFl), Poly(New Fuchsin) (PnF), Polyfluorene (PF), Poly(9-Fluorenone) (PFO), Poly (9,10-Dihydrophenanthrene), Poly(p-Phenylene) (PPP), Poly(Phenylenevinylene) (PPPV), Polytriphenylamine (PTPA), Poly(4-Vinyl-Triphenylamine) (PVTPA), Polyrhodanine (PRh), Poly (Eriochrome Black T), Poly(5-Amino-1,4-Naphthoquinone) (PANQ), Poly(5-Amino-1-Naphthol), Poly(4-Ferrocenylmethylidene-4H-Cyclopenta-[2,1-b;3,4-b°]-Dithiophene), Fullerene-Functionalized Poly(Terthiophenes) (PTTh-BB), Poly[Iron(4-(2-Pyrrol-1-Ylethyl)-4°-Methyl-2,2°-Bipyridine)$_3$$^{2+}$], Polypyrrole Functionalized by Ru(bpy)(CO)$_2$, Poly(Tetra-Substituted Porphyrins), Poly(Tetra-Substituted Phtalocyanines),) Poly[4,4°(5°-Bis(3,4-Ethylenedioxy)Thien-2-Yl] Tetrathiafulvalene (PEDOT-TTF), Poly {3-[7-Oxa-8-(4-Tetrathiafulvalenyl) Octyl]-2,2°-Bithiophene} (PT-TTF), Poly (Aniline-co-Diaminodiphenyl Sulfone), Poly(Aniline-co-2/3-Amino or 2,5-Diamino Benzenesulfonic Acid), Poly (Aniline-co-o-Aminophenol), Poly(m-Toluidine-co-o-Phenylenediamine), Poly (Luminol-Aniline), polymer of 2,5-dihydroxy-1,4-benzenediacetic acid (PDHAA), poly-para-phenylenediamine (PpPDA), and polyhydroquinone (PHQ), preferably among polydopamine (PDA), poly-para-phenylenediamine (PpPDA), polyhydroquinone (PHQ), polymer of 1,4-benzenedithiol (PBDT), polytyramine (PTA) or polymer of 2,5-dihydroxy-1,4-benzenediacetic acid (PDHAA).

Hereunder are the semi-developed formulas of some of the previously cited polymers:

Polymer of 1,4-benzenedithiol (PBDT):

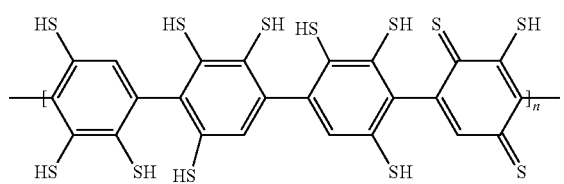

PBDT is a polymer comprising several monomers of 1,4-benzenedithiol.

polyhydroquinone (PHQ):

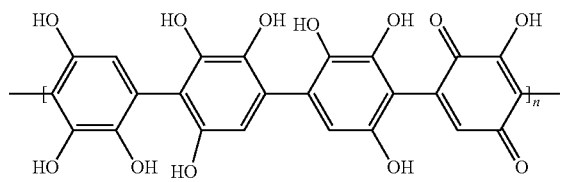

PHQ is a polymer comprising several monomers of hydroquinone.

Poly-para-phenylenediamine (PpPDA):

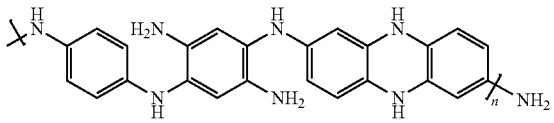

PpPDA is a polymer comprising several monomers of para-phenylenediamine.

polytyramine (PTA):

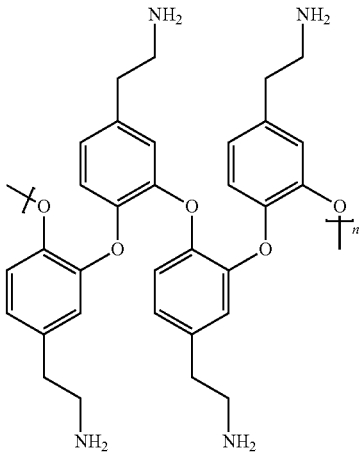

PTA is a polymer comprising several monomers of tyramine.

polydopamine (PDA):

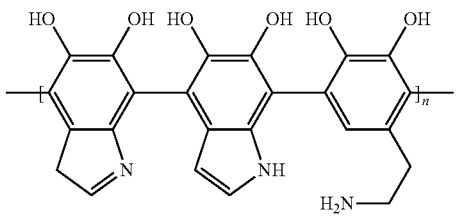

PDA is a polymer comprising several monomers of dopamine.

Preferably, the porous template according to the invention includes at least a metal, for example Fe or Cu.

A porous template comprising at least a metal has the advantage to drive polymerization and to attach to the polymer allowing easy separation from the solution.

The applicants have shown that the metal can help drive the polymerization process. Once the monomer is in contact with the porous template comprising metal, it interacts with the metal, which behaves like a catalyst to form the polymer. Because of this process, most of the formed polymer is located inside the porous m template rather than on the surface outside. With the polymer trapped inside and/or attached to the metal inside, it cannot leave the porous template. As a polymer is quite hydrophilic, if it came out of the porous template, it would potentially disperse in the water. As such, the polymer by itself is more difficult to separate from water than the composite comprising both the porous template and the polymer. Therefore, using a porous template comprising at least one metal is advantageous because with such a template the polymer does not disperse in water, making it easy to separate after extraction of the metal or contaminating chemical specie of interest.

Although a porous template comprising at least one metal is preferred for the reasons discussed above, a porous template not including metal can also be used in the present invention. In that case, it would be necessary to adapt the process of polymerization by common techniques.

Preferably, the at least one porous template is chosen among a metal-organic framework, a zeolite, carbons, a silica, an aerogel, a covalent organic framework, a porous polymer network, a porous molecular solid, an hydrogel, a porous boron nitride, a porous graphene and a porous graphene oxide, more preferably among a metal-organic framework, a zeolite, carbons, a silica, an aerogel, a covalent organic framework, a porous polymer network, a porous molecular solid and an hydrogel.

Even more preferably, said at least one porous template is a metal organic framework (MOF).

Metal organic frameworks (MOFs) are a relatively new class of microporous materials constructed by metal-ions or metal-ions clusters interlinked by organic ligands. Their high internal surface area makes them an ideal candidate for uptake of ions.

In the context of the invention, preferred MOFs are chosen among Fe-BTC, Cu-BTC, Cu-TDPAT and Al-BDC-NH$_2$, preferably among Fe-BTC and Cu-BTC.

As mentioned before, the invention aims at extracting one or more specific metal or contaminating chemical species from an aerial or aqueous medium.

Said one or more metal or contaminating chemical species is typically chosen among: palladium, platinum, ruthenium, iridium, gold, silver, rhodium, cadmium, chromium, lead, mercury, arsenic, barium, fluoride, nitrates, nitrites, radium, selenium, sodium, radioactive (U, Th, Ra, Cs), lithium, magnesium, indium, gallium, germanium, tellurium, bismuth, rhenium, niobium, molybdenum, osmium, lanthanides, iron, cobalt, nickel, copper, zinc, ozone, chlorine gas, ammonia, hormones, dyes, volatile organic compounds, perchlorate and hydrocarbons (oil). Preferably, said one or more metal or contaminating chemical species is chosen among palladium, platinum, ruthenium, iridium, gold, silver, rhodium, cadmium, chromium, lead, mercury, arsenic, iron, cobalt, nickel and copper, even more preferably among precious metals such as palladium, platinum, ruthenium, iridium, gold, silver and rhodium.

The composite according to the invention is highly porous with a high density of designable functional groups resulting in high selectivity for the metal or contaminating chemical specie of interest.

The mechanism of action of the composite according to the invention depends on the target chemical specie to extract.

In some cases, the composite acts by reducing the chemical specie of interest. It is the case for example for the Hg, Au, Ag or Pd species in solution and it is also probably the case of toxic chlorine gas or ozone from air.

In some cases, the reduction leads to a solid compound. For example, Au$^{3+}$ is reduced in Au$^0_{(s)}$ and thus precipitates into a solid material, which facilitates its extraction.

Hexavalent chromium ions Cr$^{6+}$ that are very toxic can be reduced into Cr$^{3+}$ species by the composite according to the invention. It does not always precipitate but it is still very advantageous as Cr$^{3+}$ is 500 to 1000 times less toxic than Cr$^{6+}$.

Some other chemical species like Pb are more probably extracted, typically from water, by other mechanisms, like selective adsorption.

The composite according to the invention is also easily recyclable with mild cheap additives like ascorbic acid or ethylenediaminetetraacetic acid (EDTA).

Once the compound of interest is transformed or captured by the composite according to the invention, several means can be used for its extraction from the medium and then from the composite.

In the case of gold, which is in solid form with the composite, it is possible to use the composite over and over until you want to separate the gold. At this time, it would be possible to simply heat, for example around 900° C., and adjust the pH to very acidic values, typically values below 3, to destroy the porous template and polymer in order to recover the gold. The destruction of the porous template have minimal economic impact considering its low cost.

Another option is to use the composite, once it reaches maximal capacity for the target chemical specie (typically precious metal), as a catalyst.

Another option, for example in the case of gold extraction from water, is to use a sturdy porous template, typically a porous carbon, which can resist the chemical conditions needed to oxidize the gold back to the 3$^+$ oxidation state to be washed out of the composites.

The composite according to the invention is highly competitive with regard to capacity, removal rate, facile synthetic conditions and selectivity compared to the current state of the art. It operates well at room temperature requiring no energy input to heat the solutions to drive the reduction process.

Other details and advantages of the present application will become more fully apparent from the following description taken in conjunction with the accompanying drawings.

DETAILED DESCRIPTION

The applicants have started to design components for mercury remediation in order to produce clean potable water.

Figure 1:
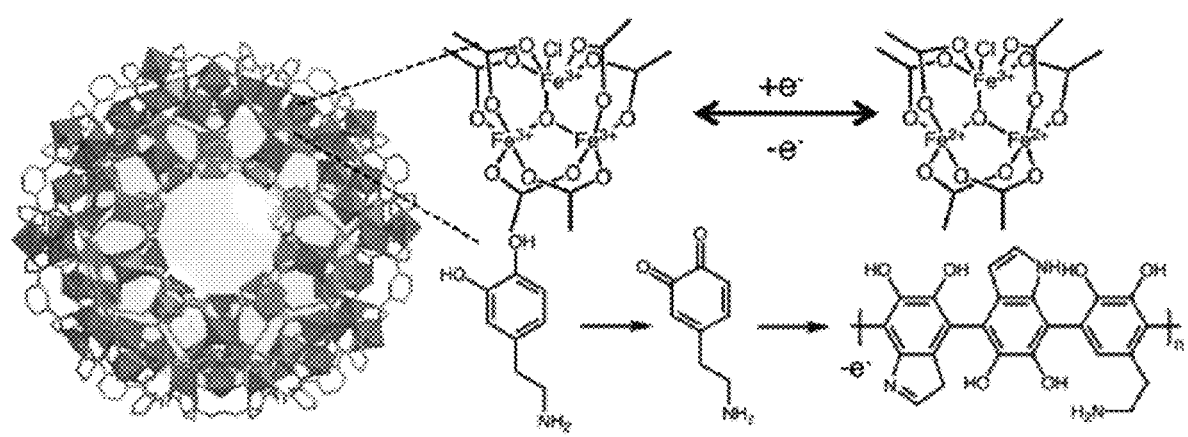
FIG. 1 illustrates the architecture of the porous template Fe-BTC and the polymerization of the monomer dopamine into polydopamine in this porous template.

In this work, the applicants have synthesized a cheap environmentally and biologically friendly iron base porous metal-organic framework (MOF), known as Fe-BTC, as shown in FIG. 1 (detailed process of synthesis at the end of the patent application).

The MOFs unique framework architecture allows metal ions to diffuse through while inhibiting large organic molecules (like humic acid) from entering.

The Fe-BTC MOF acts as a porous template that catalyzes the in-situ polymerization of a variety of small molecules.

For example, the applicants have found that the $Fe^{3+}$ sites of Fe-BTC distributed throughout the framework facilitates the polymerization of the monomer dopamine, to its polymer polydopamine (PDA) and adheres the polymer to the pore surface.

Figure 2:
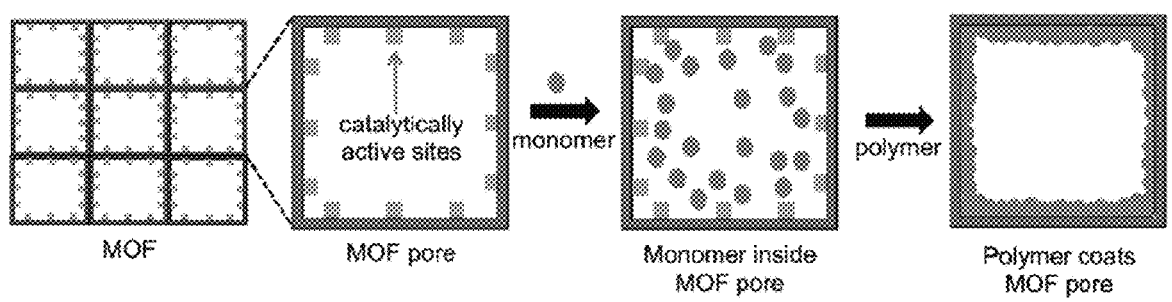
FIG. 2 is a schematic representation of a metal organic framework (MOF) and the polymerization of a monomer inside its pores.

During this process PDA is pinned to the internal surface of the pores via attachment to the open metal sites introducing extrinsic porosity to an intrinsically non-porous polymer as illustrated in FIG. 2. The result is a highly porous composite. The activity of this porous composite has been studied by the applicants.

Figure 4A:
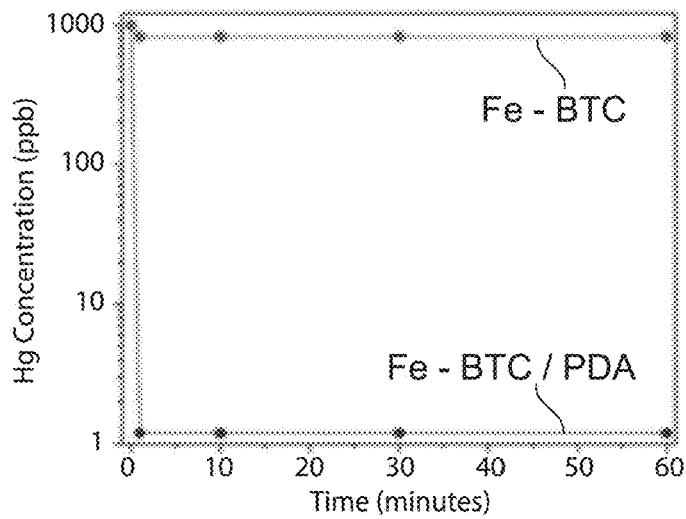
FIG. 4a shows the evolution of the mercury concentration after introduction of Fe-BTC or Fe-BTC/PDA composite in a 1 ppm Hg$^{2+}$ solution over a period of an hour.

Firstly, the applicants studied the rate of mercury removal (FIG. 4a). In order to do that, a solution of $Hg^{2+}$ has been treated with Fe-BTC/PDA or Fe-BTC over a period of an hour. For each experiment, 20 mL of Millipore water containing 1 ppm of $Hg^{2+}$ were treated with 20 mg of Fe-BTC or 20 mg of Fe-BTC/PDA.

Figure 4B:
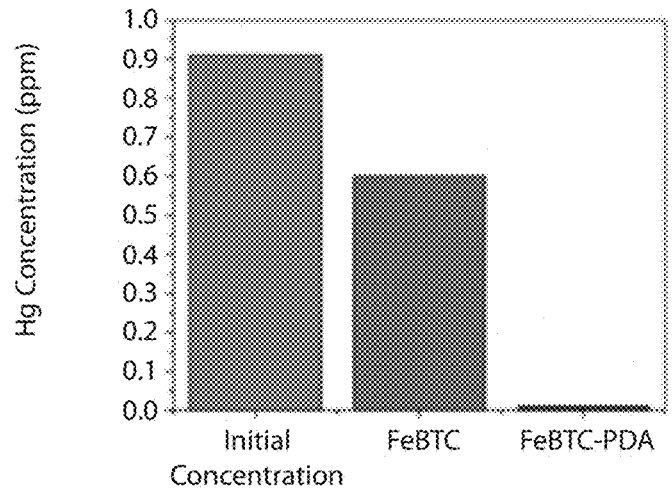
FIG. 4b is a graph showing the evolution of Hg concentration in a 0.9 ppm Hg$^{2+}$ solution after introduction of Fe-BTC or Fe-BTC/PDA for 24 hours.

Secondly, the applicants studied the mercury removal capacity at low $Hg^{2+}$ concentrations (FIG. 4b). To study this, Fe-BTC or Fe-BTC/PDA were soaked in Millipore water spiked with mercury for 24 hours. For the experiment ~10 mg of Fe-BTC or ~10 mg Fe-BTC-PDA were added to 20 mL of a 0.9 ppm solution of $Hg^{2+}$.

The results of these experiments show that Fe-BTC/PDA is a highly porous composite that fosters the rapid, selective removal of $Hg^{2+}$ from water samples containing high concentrations of $Hg^{2+}$. Indeed, the composite component Fe-BTC/PDA binds up to 1634 mg $Hg^{2+}$ per gram of composite, and removes over 99% of these ions from a 1 ppm solution to yield drinkable levels in less than a minute.

Figure 5A:
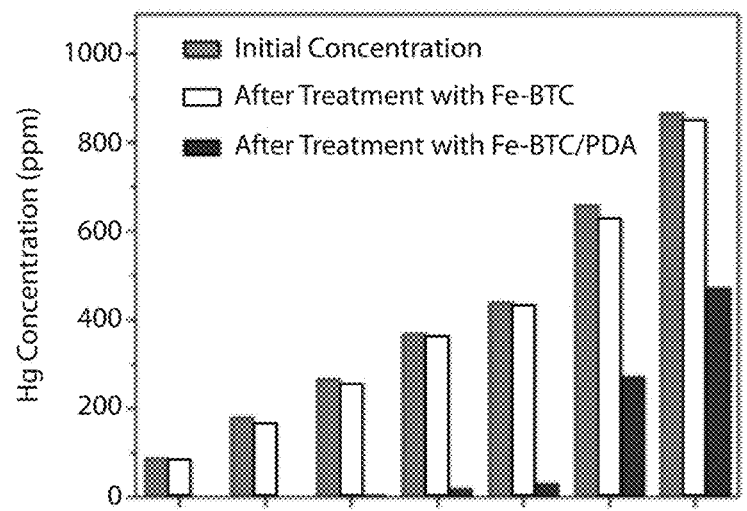
FIG. 5a shows removal capacity of Fe-BTC or Fe-BTC/PDA in river water spiked with varying concentrations of Hg$^{2+}$.

FIG. 5a shows that Fe-BTC/PDA is efficient at different initial Hg concentrations. For each experiment, ~10 mg of Fe-BTC or ~10 mg Fe-BTC/PDA were added to 20 mL of Rhone river water containing various amounts of $Hg^{2+}$.

Figure 5B:
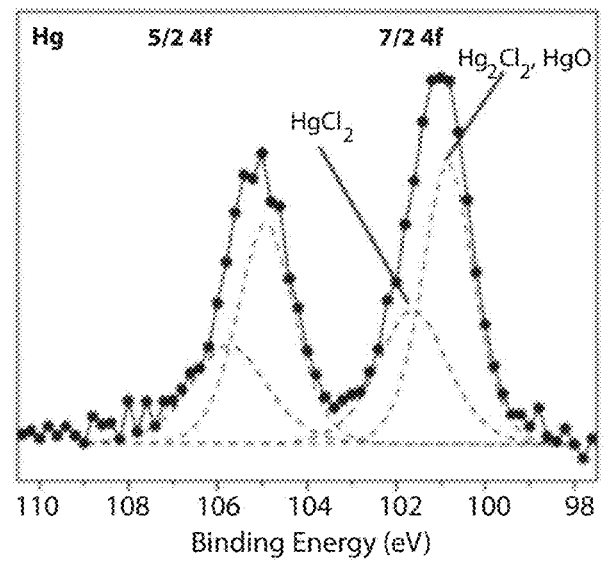
FIG. 5b present the results of X-ray photoelectron spectroscopy (XPS) of of Fe-BTC/PDA soaked in a 1000 ppm solution of $HgCl_2$ for 24 hours.
Figure 5C:
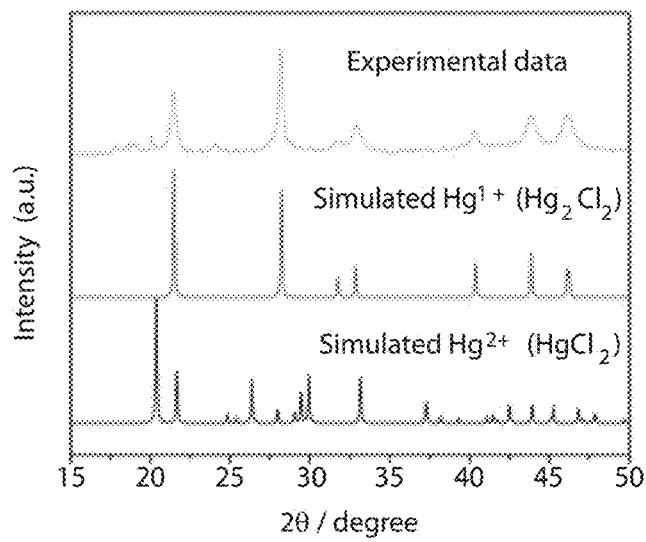
FIG. 5c shows the results of powder X-ray diffraction pattern (PXRD) of Fe-BTC/PDA after being soaked in 1000 ppm solution of $HgCl_2$ for 24 hours.

The results of the experiments shown in FIGS. 5b and 5c, clearly indicates that the high removal capacity for Hg from water is achieved via reduction of $Hg^{2+}$ to $Hg^{1+}$.

Figure 10:
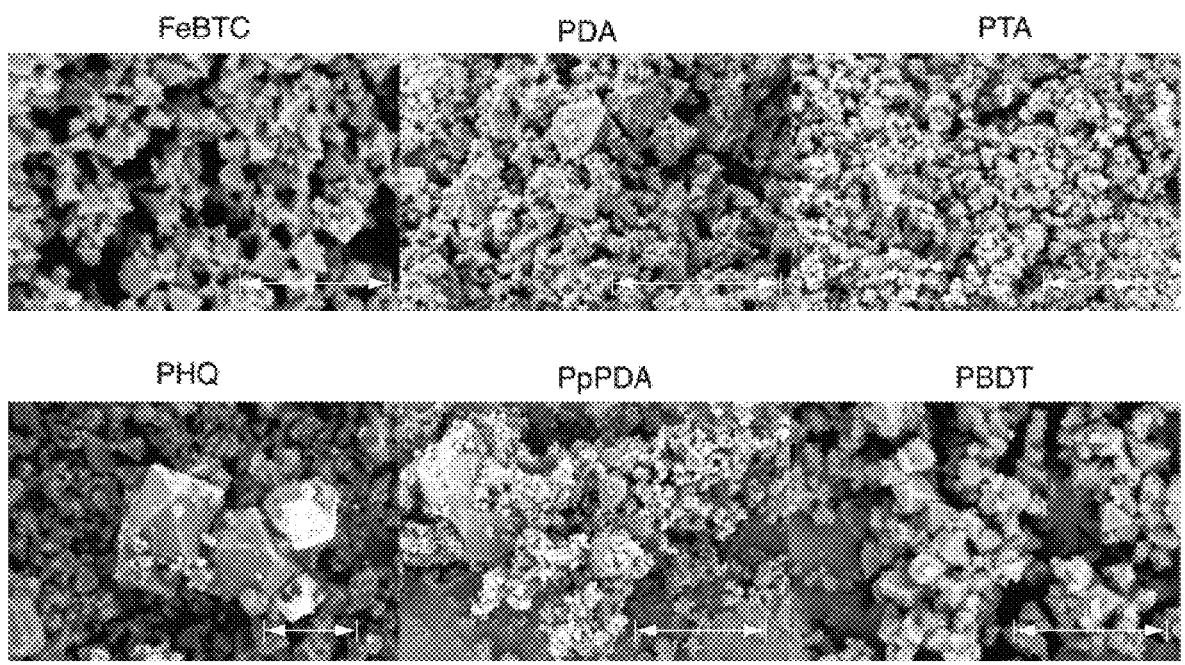

In FIG. 5b, 10 mg Fe-BTC/PDA was soaked in 20 mL of 1000 ppm solution of $HgCl_2$ for 24 hours. The XPS was used to elucidate the electronic structure of the heavy metal. Two signature peaks fitting the data for $HgCl_2$ and $Hg_2Cl_2$ or HgO were observed. This data confirms that the polymer is reducing the $Hg^{2+}$ to $Hg^{1+}$.

For the experiment presented in FIG. 5c, 10 mg Fe-BTC/PDA was soaked in 20 mL of 1000 ppm solution of $HgCl_2$ for 24 hours. After treating a solution of $Hg^{2+}$ with Fe-BTC/PDA the mercury precipitates as solid $Hg_2Cl_2$, evident by PXRD. This data also confirms that the polymer is reducing the $Hg^{2+}$ to $Hg^{1+}$.

Hereunder is the proposed mechanism of the Fe-BTC/PDA composites' enhanced properties for $Hg^{2+}$ remediation from water.

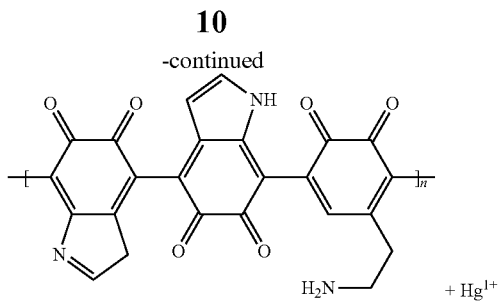

Through a reduction mechanism the Fe-BTC/PDA composite is able to remediate large quanitites of mercury.

Figure 4C:
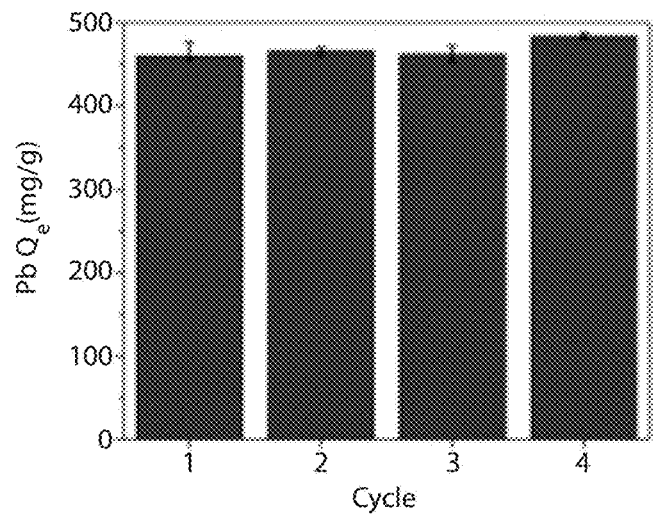
FIG. 4c shows mercury removal capacity vs cycle number.

The material Fe-BTC/PDA has also proven to be easily regenerated and cycleable after reduction of mercury as shown in FIG. 4c. For this experiment, 0.500 g of Fe-BTC/PDA was added to a 1 L solution of Milipore water spiked with 1000 ppm of $Hg^{2+}$. The remaining $Hg^{2+}$ concentration in the aqueous media were analyzed to determine the mercury capacity ($Q_e$, mg/g). The Fe-BTC/PDA samples was then added to 0.001 M solutions of ascorbic acid. The samples were filtered, washed with methanol, dried and weighed. The regenerated materials were then added to 1000 ppm solutions of $Hg^{2+}$ again. This procedure was repeated three more times to obtain the capacity $Q_e$ (mg/g) for each of the four cycles.

Previously described performance results are also maintained using real-world water samples from the Rhone River (which contains other metal ions and organics) and water samples spiked with large amounts of humic acid, illustrating the uptake selectivity of Fe-BTC/PDA. Thus, this material is an excellent, inexpensive candidate for in-home and industrial water treatment.

The applicants have discovered the impact of the MOF Fe-BTC on the polymerization of the monomer dopamine to polydopamine (PDA).

They have discovered that the polymer, PDA undergoes redox chemistry that fosters the extraordinary heavy metal remediation properties of Fe-BTC/PDA with $Hg^{2+}$.

After these experiments the applicants have tried to apply this composite to other metals with a high reduction potential starting with toxic hexavalent chromium $Cr^{6+}$. For each experiment associated to FIG. 6b, ~10 mg of Fe-BTC or ~10 mg Fe-BTC-PDA were added to 20 mL of river water containing various amounts of $Cr^{6+}$. Results of this experiment show that Fe-BTC/PDA sees a 7-fold increasing in removal capacity compared to Fe-BTC alone.

Figure 6A:
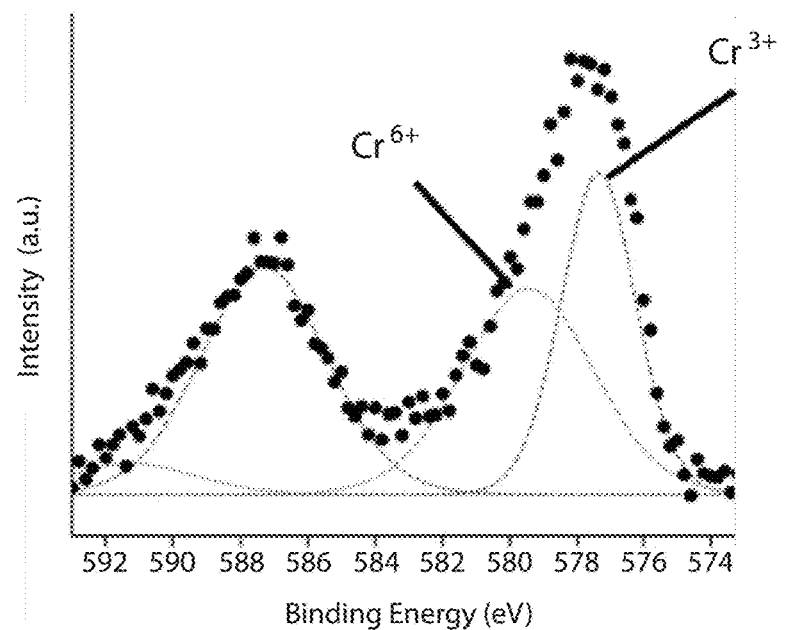
FIG. 6a shows the results of high resolution X-ray photoelectron spectroscopy (XPS) of Fe-BTC/PDA after treating an aqueous medium comprising $Cr^{6+}$.
Figure 6B:
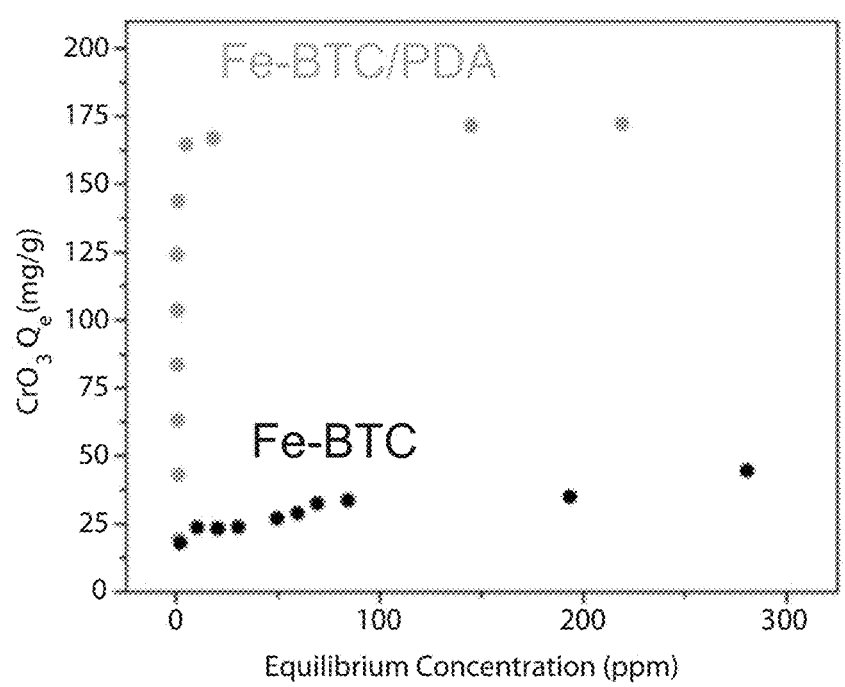
FIG. 6b shows $Cr^{6+}$ removal capacity ($Q_e$) plotted against the equilibrium concentration.

For high resolution-XPS experiment of FIG. 6a, 10 mg Fe-BTC/PDA was soaked in 20 mL of 300 ppm solution of $Cr^{6+}$ for 24 hours. Two signature peaks fitting the data for $Cr^{3+}$ and $Cr^{6+}$ species were observed. The data implies that the increase in removal capacity for Fe-BTC/PDA compared to Fe-BTC is the result of the redox active polymer reducing $Cr^{6+}$ to $Cr^{3+}$.

Hereunder is the proposed mechanism of the Fe-BTC/PDA enhanced properties for $Cr^{6+}$ remediation from water.

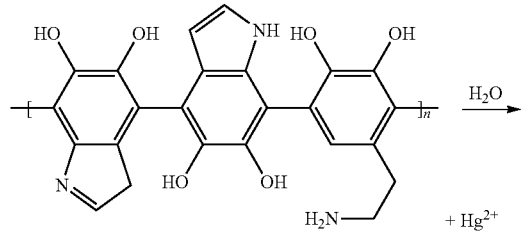

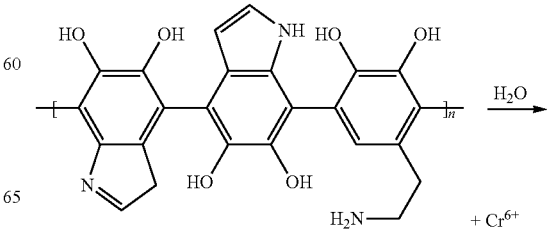

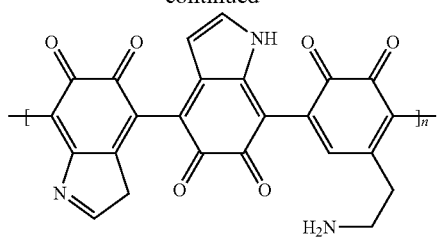

Through a reduction mechanism Fe-BTC/PDA component is able to remediate large quanitites of hexavalent chromium. This result is very interesting as $Cr^{3+}$ is 500 to 1000 times less toxic than $Cr^{6+}$ hexavalent chromium.

Previously presented results led the applicants to begin to design a variety of new redox activate MOF/polymer composites with the hope of creating high selectivity in order to design materials for specific analytes.

Indeed, since it was possible to remove over 99% of Hg from aqueous medium comprising $Hg^{2+}$ by a reduction reaction with Fe-BTC/PDA and since the standard reduction potentials of precious metals are comparable to $Hg^{2+}$ reduction potential, as shown in table 1 hereafter, it may be possible to recover other precious metals from water. It is to be noted that the standard reduction potential of $Cr^{6+}/Cr^{3+}$ is of about 1.36 as shown in table 1 hereunder.

TABLE 1

| standard reduction potentials E° of various compounds (V) | | | |
|---|---|---|---|
| Half-Reaction | E° (Volts) | Half-Reaction | E° (Volts) |
| $Li^+ + e^- \rightarrow Li$ | −3.040 | $SO_4^{2-} + 4H^+ + 2e^- \rightarrow H_2SO_3 + H_2O$ | 0.158 |
| $K^+ + e^- \rightarrow K$ | −2.942 | $Cu^{2+} + e^- \rightarrow Cu^+$ | 0.159 |
| $Rb^+ + e^- \rightarrow Rb$ | −2.942 | $HAsO_2 + 3H^+ + 3e^- \rightarrow As + 2H_2O$ | 0.248 |
| $Cs^+ + e^- \rightarrow Cs$ | −2.923 | $UO_2^{2+} + 4H^+ + 2e^- \rightarrow U^{4+} + 2H_2O$ | 0.27 |
| $Ba^{2+} + 2e^- \rightarrow Ba$ | −2.92 | $Bi^{3+} + 3e^- \rightarrow Bi$ | 0.3172 |
| $Sr^{2+} + 2e^- \rightarrow Sr$ | −2.89 | $Cu^{2+} + 2e^- \rightarrow Cu$ | 0.340 |
| $Ca^{2+} + 2e^- \rightarrow Ca$ | −2.84 | $O_2 + 2H_2O + 4e^- \rightarrow 4OH^-$ | 0.401 |
| $Na^+ + e^- \rightarrow Na$ | −2.713 | $Cu^+ + e^- \rightarrow Cu$ | 0.520 |
| $La^{3+} + 3e^- \rightarrow La$ | −2.37 | $I_2 + 2e^- \rightarrow 2I^-$ | 0.5355 |
| $Mg^{2+} + 2e^- \rightarrow Mg$ | −2.356 | $H_3AsO_4 + 2H^+ + 2e^- \rightarrow HAsO_2 + 2H_2O$ | 0.560 |
| $Ce^{3+} + 3e^- \rightarrow Ce$ | −2.34 | $O_2 + 2H^+ + 2e^- \rightarrow H_2O_2$ | 0.695 |
| $Nd^{3+} + 3e^- \rightarrow Nd$ | −2.32 | $Rh^{3+} + 3e^- \rightarrow Rh$ | 0.7 |
| $H_2 + 2e^- \rightarrow 2H^-$ | −2.25 | $Tl^{3+} + 3e^- \rightarrow Tl$ | 0.72 |
| $Sc^{3+} + 3e^- \rightarrow Sc$ | −2.03 | $Fe^{3+} + e^- \rightarrow Fe^{2+}$ | 0.771 |
| $Be^{2+} + 2e^- \rightarrow Be$ | −1.97 | $NO_3^- + 2H^+ + e^- \rightarrow NO_2 + H_2O$ | 0.775 |
| $Al^{3+} + 3e^- \rightarrow Al$ | −1.676 | $Hg_2^{2+} + 2e^- \rightarrow Hg$ | 0.7960 |
| $U^{3+} + 3e^- \rightarrow U$ | −1.66 | $Ag^+ + e^- \rightarrow Ag$ | 0.7991 |
| $Ti^{2+} + 2e^- \rightarrow Ti$ | −1.63 | $O_2 + 4H^+ (10^{-7}M) + 4e^- \rightarrow 2H_2O$ | 0.815 |
| $Hf^{4+} + 4e^- \rightarrow Hf$ | −1.56 | $AmO_2^+ + 4H^+ + e^- \rightarrow Am^{4+} + 2H_2O$ | 0.82 |
| $No^{3+} + 3e^- \rightarrow No$ | −1.2 | $NO_3^- + 2H^+ + 2e^- \rightarrow NO_2^- + H_2O$ | 0.835 |
| $Mn^{2+} + 2e^- \rightarrow Mn$ | −1.18 | $OsO_4 + 8H^+ + 8e^- \rightarrow Os + 4H_2O$ | 0.84 |
| $Cr^{2+} + 2e^- \rightarrow Cr$ | −0.90 | $Hg^{2+} + 2e^- \rightarrow Hg$ | 0.8535 |
| $2H_2O + 2e^- \rightarrow H_2 + 2OH^-$ | −0.828 | $2Hg^+ + 2e^- \rightarrow Hg_2^{2+}$ | 0.9110 |
| $Zn^{2+} + 2e^- \rightarrow Zn$ | −0.7626 | $Pd^{2+} + 2e^- \rightarrow Pd$ | 0.915 |
| $Cr^{3+} + 3e^- \rightarrow Cr$ | −0.74 | $NO_3^- + 4H^+ + 3e^- \rightarrow NO(g) + 2H_2O$ | 0.957 |
| $Ga^{3+} + 3e^- \rightarrow Ga$ | −0.529 | $Br^{2+} + 2e^- \rightarrow 2Br^-$ | 1.0652 |
| $U^{4+} + e^- > U^{3+}$ | −0.52 | $SeO_4^{2-} + 4H^+ + 2e^- \rightarrow H_2SeO_3 + H_2O$ | 1.151 |
| $2CO_2 + 2H^+ + 2e^- \rightarrow H_2C_2O_4$ | −0.475 | $Ir^{3+} + 3e^- \rightarrow Ir$ | 1.156 |
| $S + 2e^- \rightarrow S^{2-}$ | −0.447 | $Pt^{2+} + 2e^- \rightarrow Pt$ | 1.188 |
| $Fe^{2+} + 2e^- \rightarrow Fe$ | −0.44 | $O_2 + 4H^+ + 4e^- \rightarrow 2H_2O$ | 1.229 |
| $Cr^{3+} + e^- \rightarrow Cr^{2+}$ | −0.424 | $Tl^{3+} + 2e^- \rightarrow Tl^+$ | 1.25 |
| $2H_2O + 2e^- \rightarrow H_2 + 2OH^- (10^{-7}M)$ | −0.414 | $Pd^{4+} + 2e^- \rightarrow Pd^{2+}$ | 1.263 |
| $Cd^{2+} + 2e^- \rightarrow Cd$ | −0.4025 | $Cl_2 + 2e^- \rightarrow 2Cl^-$ | 1.35828 |
| $Ti^{3+} + e^- \rightarrow Ti^{2+}$ | −0.37 | $Au^{3+} + 2e^- \rightarrow Au^+$ | 1.36 |
| $PbI_2 + 2e^- \rightarrow Pb + 2I^-$ | −0.365 | $Cr_2O_7^{2-} + 14H^+ + 6e^- \rightarrow 2Cr^{3+} + 7H_2O$ | 1.36 |
| $PbSO_4 + 2e^- \rightarrow Pb + SO_4$ | −0.3505 | $MnO_4^- + 8H^+ + 5e^- \rightarrow Mn^{2+} + 4H_2O$ | 1.51 |
| $In^{3+} + 3e^- \rightarrow In$ | −0.3382 | $Au^{3+} + 3e^- \rightarrow Au$ | 1.52 |
| $Tl^+ + e^- \rightarrow Tl$ | −0.3363 | $H_5IO_6 + H^+ + 2e^- \rightarrow IO_3^- + 3H_2O$ | 1.603 |
| $Co^{2+} + 2e^- \rightarrow Co$ | −0.277 | $2HBrO + 2H^+ + 2e^- \rightarrow Br^2 + 2H_2O$ | 1.604 |
| $H_3PO_4 + 2H^+ + 2e^- \rightarrow H_3PO_3 + H_2O$ | −0.276 | $PbO_2 + 2SO_4^{2-} + 4H^+ + 2e^- \rightarrow PbSO_4 + 2H_2O$ | 1.698 |
| $Ni^{2+} + 2e^- \rightarrow Ni$ | −0.257 | $H_2O_2 + 2H^+ + 2e^- \rightarrow 2H_2O$ | 1.763 |
| $Sn^{2+} + 2e^- \rightarrow Sn$ | −0.136 | $Au^+ + e^- \rightarrow Au$ | 1.83 |
| $Pb^{2+} + 2e^- \rightarrow Pb$ | −0.1251 | $Co^{3+} + e^- \rightarrow Co^{2+}$ | 1.92 |
| $Hg_2I_2 + 2e^- \rightarrow 2Hg + 2I^-$ | −0.0405 | $S_2O_8^{2-} + 2e^- \rightarrow 2SO_4^{2-}$ | 1.96 |
| $Fe^{3+} + 3e^- \rightarrow Fe$ | −0.04 | $O_3 + 2H^+ + 2e^- \rightarrow O_2 + H_2O$ | 2.075 |
| $2H^+ + 2e^- \rightarrow H_2$ | 0.0000 | $F_2 + 2e^- \rightarrow 2F^-$ | 2.87 |
| $Sn^{4+} + 2e^- \rightarrow Sn^{2+}$ | 0.154 | $F_2 + 2H^+ + 2e^- \rightarrow 2HF$ | 3.053 |

Figure 7:
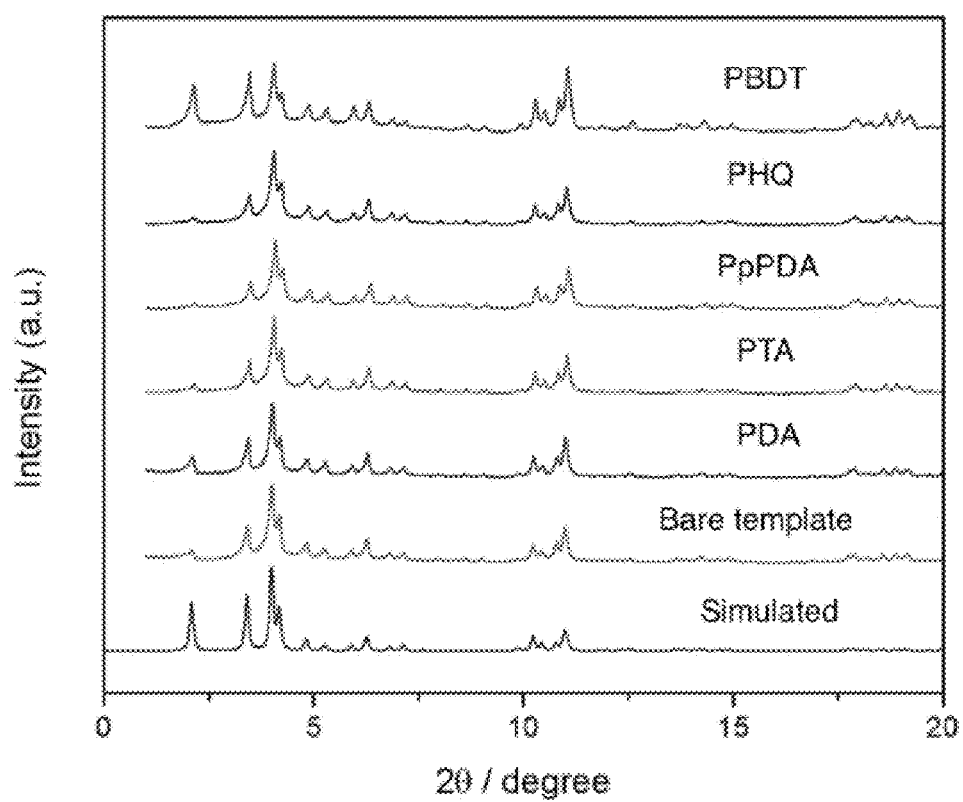
FIGS. 7, 8, 9 and 10 respectively show the results of powder X-ray diffraction patterns, nitrogen adsorption isotherms at 77K, total reflectance infrared spectroscopy and scanning electron microscopy of the porous template Fe-BTC after reaction with 1,4-benzenedithiol (leading to polymerized 1,4-benzenedithiol—PBDT), hydroquinone (leading to polymerized hydroquinone—PHQ), para-phenylenediamine (leading to poly-para-phenylenediamine—PpPDA), tyramine (leading to polytyramine—PTA) or dopamine (leading to polydopamine—PDA).

With this in mind, the applicants have synthesized and tested the following composites: Fe-BTC/PBDT, Fe-BTC/PHQ, Fe-BTC/PpPDA, Fe-BTC/PTA and Fe-BTC/PDA. In all polymerization reactions, the porous template retains its structural integrity, as determined by the powder x-ray diffraction patterns of FIG. 7.

Figure 8:
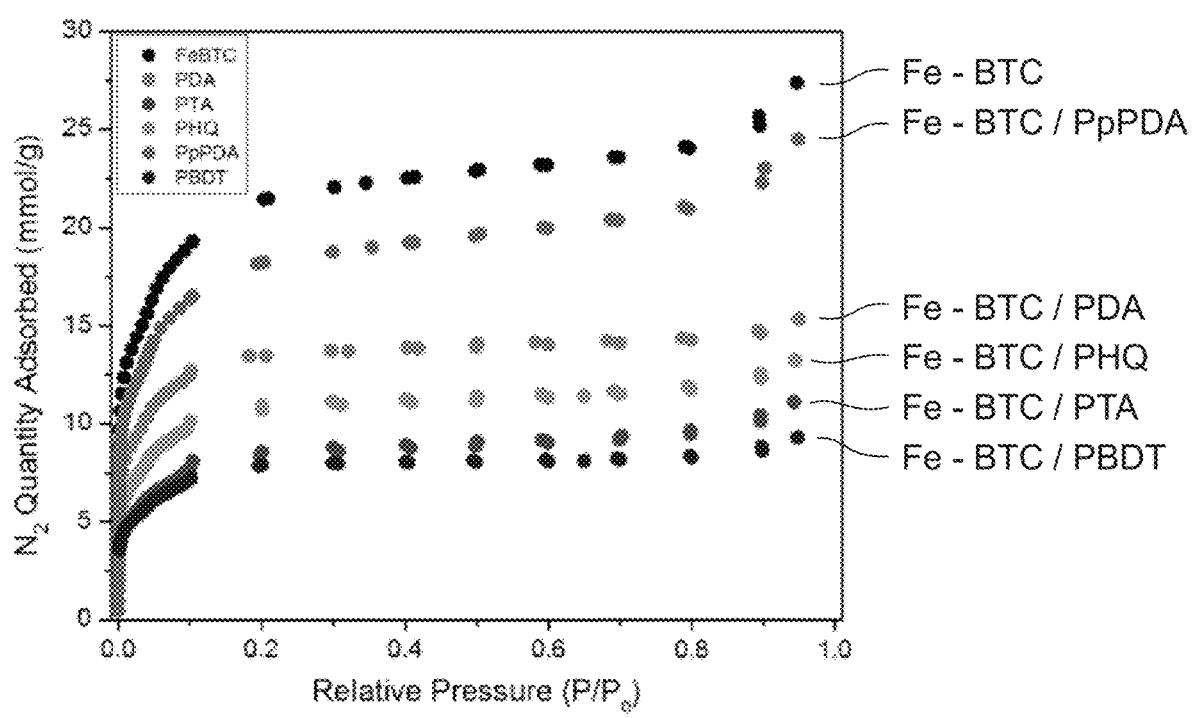

These new composites are quite porous as illustrated by the results of nitrogen adsorption isotherms (77K) of FIG. 8.

Figure 9:
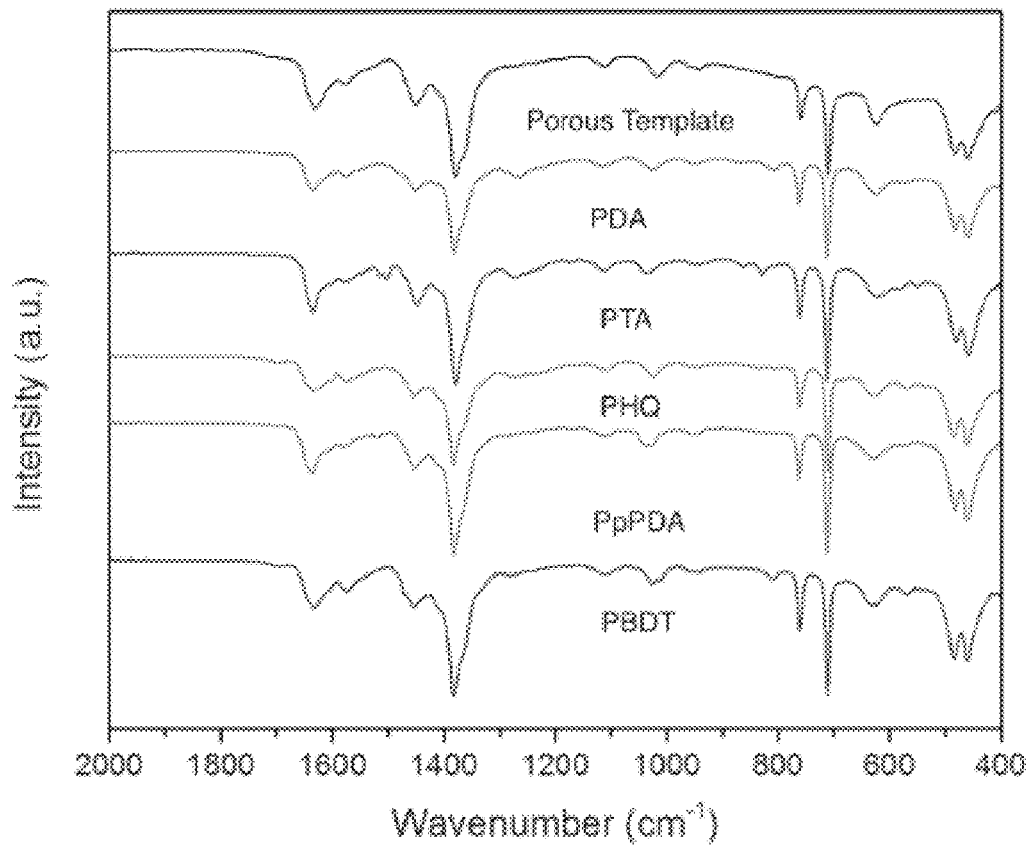

Attenuated total reflectance infrared spectroscopy illustrate new peaks from the vibration modes of the functional groups of the polymers of these composites (see FIG. 9). Moreover, FIG. 10 shows numerous crystal facets hinting at polymerization inside the pores.

Figure 11A:
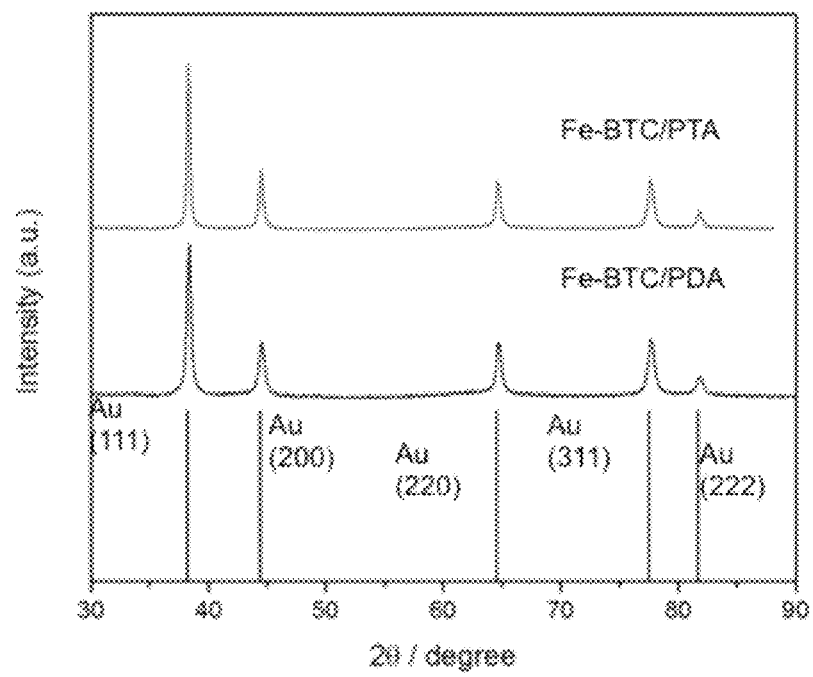
FIG. 11a powder X-ray diffraction patterns of Fe-BTC/PTA and Fe-BTC/PDA after being soaked in an aqueous solution containing $Au^{3+}$.

FIG. 11a illustrates that the composites Fe-BTC/PDA and Fe-BTC/PTA are capable of reducing $Au^{3+}$ to $Au^0$. For each experiment, ~10 mg of Fe-BTC/PTA or ~10 mg Fe-BTC-PDA were soaked in 20 mL of Milipore water containing 500 ppm of $Au^{3+}$ for 24 hours.

Hereunder is the proposed mechanism of the Fe-BTC/PDA composite's enhanced properties for $Au^{3+}$ remediation from water.

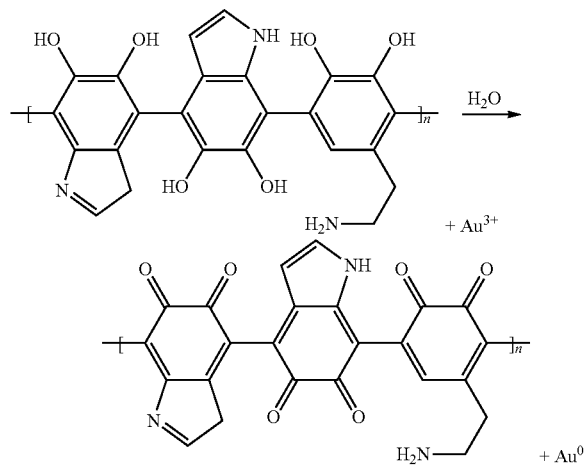

Figure 11B:
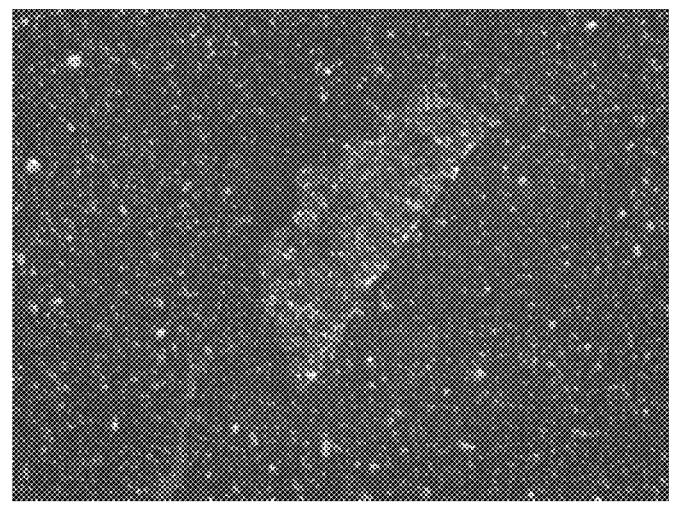
FIG. 11b microscope image of an aqueous solution containing $Au^{3+}$ after reaction with Fe-BTC/PDA.

Such a mechanism is confirmed by FIG. 11b that shows the apparition of solid gold $Au^0(s)$ after contacting Fe-BTC/PDA. Similar results are obtained with Fe-BTC/PTA composite.

Figure 12A:
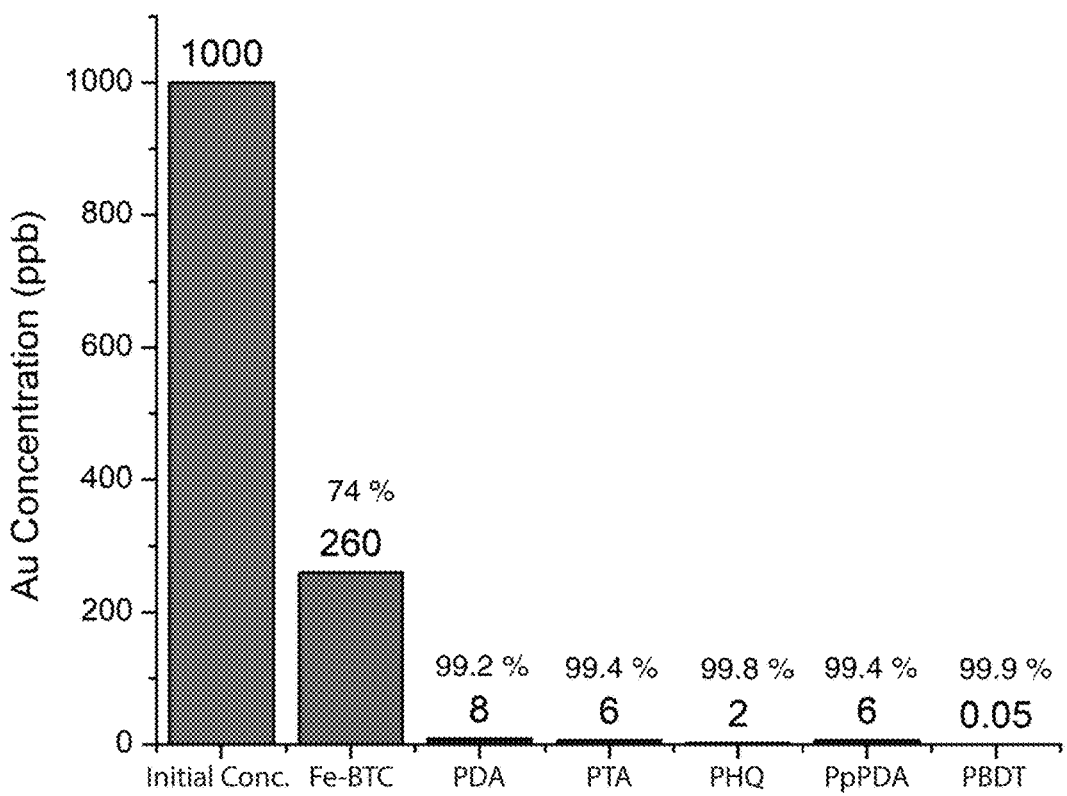
FIGS. 12a and 12b are bar graphs illustrating the evolution of gold concentration in a water solution comprising respectively 1 ppb $Au^{3+}$ and in a 90 ppm $Au^{3+}$ before and after being in presence of Fe-BTC or composites Fe-BTC/PDA, Fe-BTC/PTA, Fe-BTC/PHQ, Fe-BTC/PpPDA or Fe-BTC/PBDT for 24 hours.
Figure 12B:
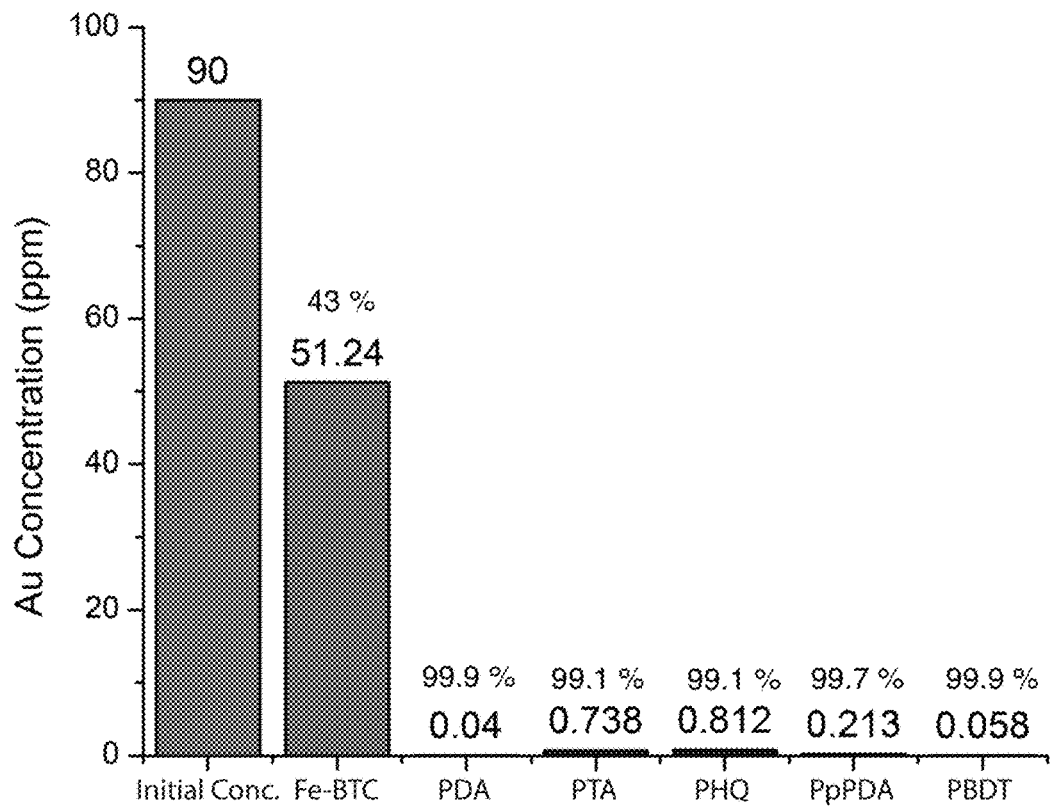

For each experiment of FIGS. 12a and 12b, 10 mg of Fe-BTC, Fe-BTC/PDA, Fe-BTC/PTA, Fe-BTC/PHQ, Fe-BTC/PpPDA or Fe-BTC/PBDT were soaked in 20 mL of the Millipore water spiked with $Au^{3+}$ for 24 hours. All the studied composites Fe-BTC/PDA, Fe-BTC/PTA, BTC/PHQ, Fe-BTC/PpPDA and BTC/PBDT, in a 1 ppm solution, have the ability to remove over 99% of gold from water compared to the Fe-BTC alone which only retains 74% of the gold as shown in FIG. 12a. While the capacities of all composites have not been determined, Fe-BTC/PDA, is able to remove up to 1.3 g of Au per gram of composite. The applicants estimate the cost of the raw materials needed to make the composite, if bought on a ton scale, to be around 2.5 USD per kg of composite.

Figure 13A:
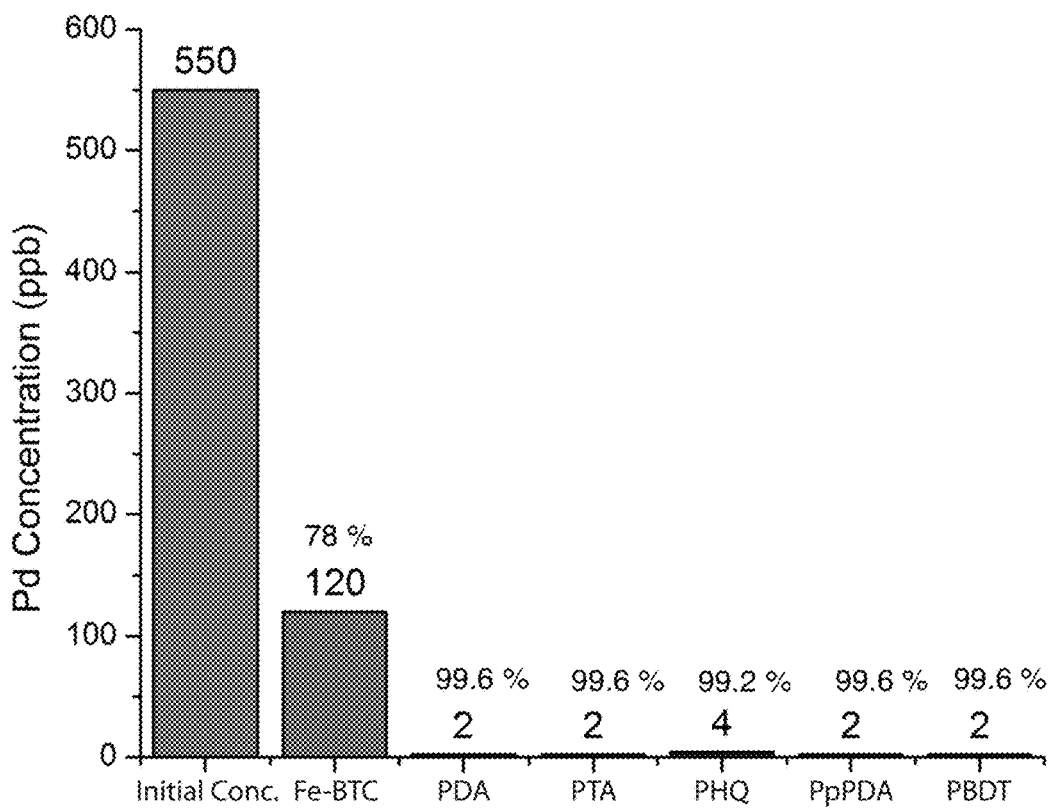
FIGS. 13a and 13b are bar graphs illustrating the evolution of palladium concentration in a water solution comprising respectively 550 ppb $Pd^{2+}$ and 55 ppm $Pd^{2+}$ before and after being in presence of Fe-BTC or composites Fe-BTC/PDA, Fe-BTC/PTA, Fe-BTC/PHQ, Fe-BTC/PpPDA or Fe-BTC/PBDT for 24 hours.
Figure 13B:
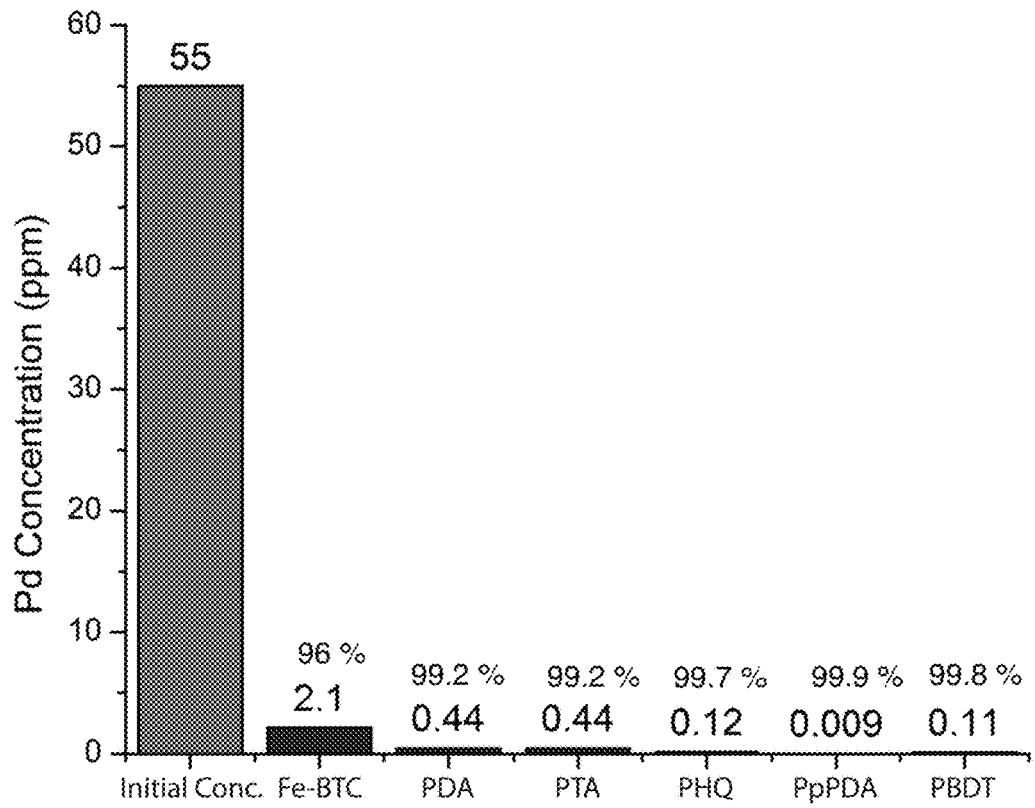

For each experiment of FIGS. 13a and 13b, 10 mg of Fe-BTC, Fe BTC/PDA, Fe BTC/PTA, Fe BTC/PHQ, Fe BTC/PpPDA or Fe BTC/PBDT were soaked in 20 mL of the Millipore water spiked with $Pd^{2+}$ for 24 hours. Results of FIG. 13a show that, for palladium, the situation is similar as for gold. Indeed, all composites remove 99% of palladium from water in a 550 ppb Pd aqueous solution compared to 78% for the Fe-BTC template.

Figure 14A:
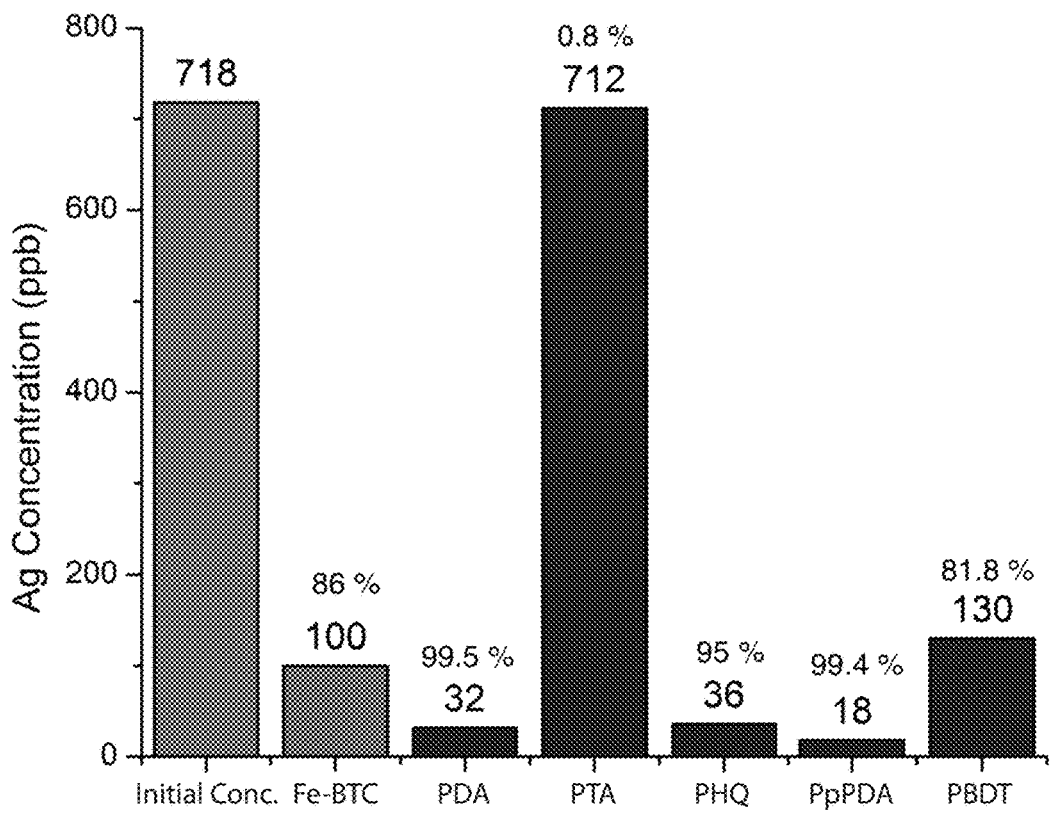
FIGS. 14a and 14b are bar graphs illustrating the evolution of silver concentration in a water solution comprising respectively 718 ppb $Ag^+$ and 90.5 ppm $Ag^+$ before and after being in presence of Fe-BTC or composites Fe-BTC/PDA, Fe-BTC/PTA, Fe-BTC/PHQ, Fe-BTC/PpPDA or Fe-BTC/PBDT for 24 hours.
Figure 14B:
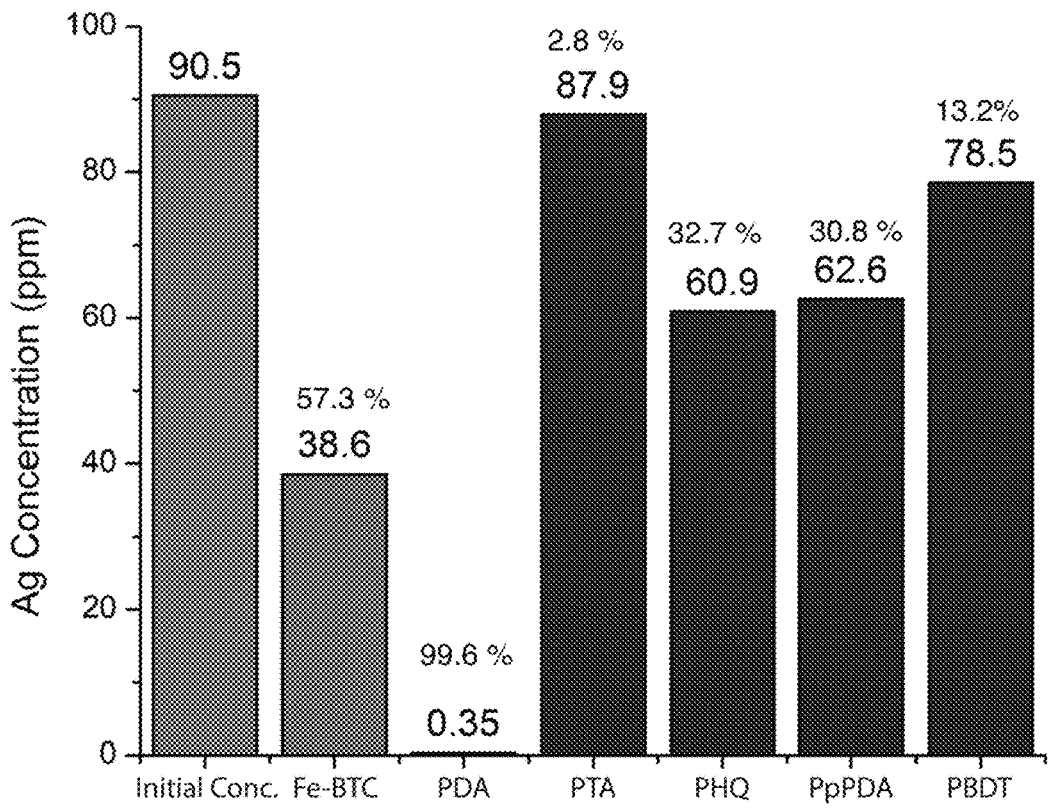

For each experiment of FIGS. 14a and 14b, 10 mg of Fe-BTC, Fe BTC/PDA, Fe BTC/PTA, Fe BTC/PHQ, Fe BTC/PpPDA or Fe BTC/PBDT were soaked in 20 mL of the Millipore water spiked with $Ag+$ for 24 hours. The data reveals over 99% silver removal for one of the composites, which is significantly enhanced compared to Fe-BTC. Results of FIG. 14a show that, for silver, the situation differs. The bare framework Fe-BTC can remove 86% of Ag ions from water in a 718 ppb Ag aqueous solution. Fe-BTC/PDA, Fe-BTC/PpPDA and Fe-BTC/PHQ can remove over 95% of Ag of the same 718 ppb Ag aqueous solution. In the same 718 ppb Ag aqueous solution, Fe-BTC/PBDT only removes 81.8%, which is less than the bare framework and Fe-BTC/PTA removes only 0.8% of Ag illustrating no activity.

From a roughly 100 ppm solution of Au, the bare framework is only able to remove 43% of the gold from water, but all the composites can remove over 99% of the gold, with some composites reaching even 99.9% removal as shown in FIG. 12b.

For Pd, the bare framework can remove 96% from a 55 ppm solution while all the other composites can remove over 99% of Pd, as shown in FIG. 13b.

Concerning Ag, at roughly 90 ppm (90.5 ppm), most composites showed removal capabilities less than the bare framework, but interestingly Fe-BTC/PDA is the only composite that is highly active for silver, removing over 99% of Ag from water, as shown in FIG. 14b.

These results illustrate that the different redox active composites Fe-BTC/PBDT, Fe-BTC/PHQ, Fe-BTC/PpPDA, Fe-BTC/PTA and Fe-BTC/PDA can reduce and/or remove precious metals from aqueous media.

It is to be noted that changing the polymer alters the activity and hence the selectivity of the composite towards certain precious metals. Remarkably the composites are highly selective and fast.

Figure 15A:
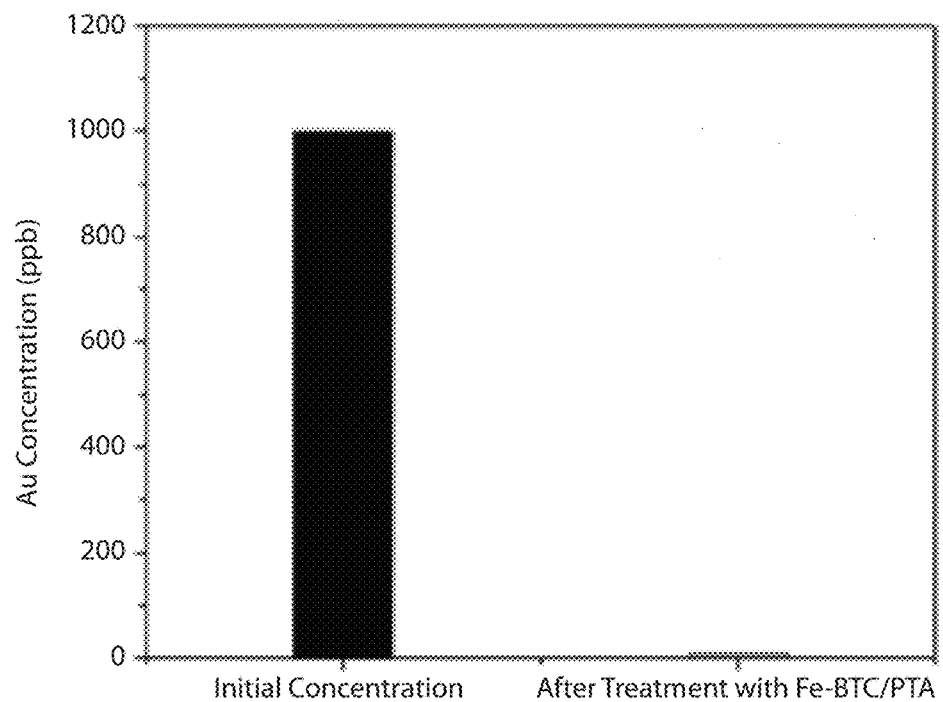
FIGS. 15a and 15b show respectively the evolution of $Au^{3+}$ concentration in a 1 ppm $Au^{3+}$ aqueous solution from the Rhone river before and after treatment with Fe-BTC/PTA for 24 hours and the gold removal rate associated to this reaction.
Figure 15B:
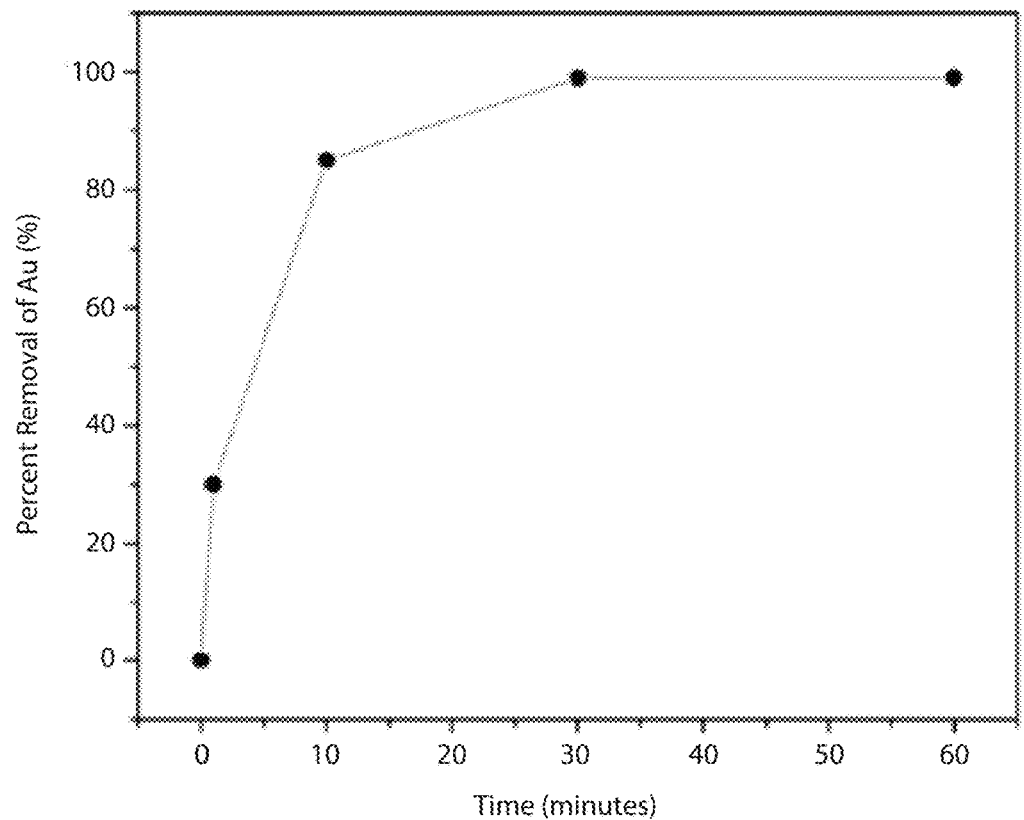

For the experiment of FIG. 15a, Rhone River water was spiked with 1 ppm of $Au^{3+}$ and then 10 mg of Fe-BTC/PTA were soaked in the 20 mL of water for 24 hours. For the experiment of FIG. 15b, ~10 mg Fe-BTC/PTA were soaked in 20 mL of Milipore water spiked with 1 ppm of $Au^{3+}$. Using Fe-BTC/PTA as an example, it has been found that it removes over 99% of gold in a 1 ppm aqueous solution in less than 30 minutes, as shown in FIG. 15b. Fe-BTC/PTA illustrate high selectivity for Au over common interferents found in river water, such as Ca and large organics.

Figure 16A:
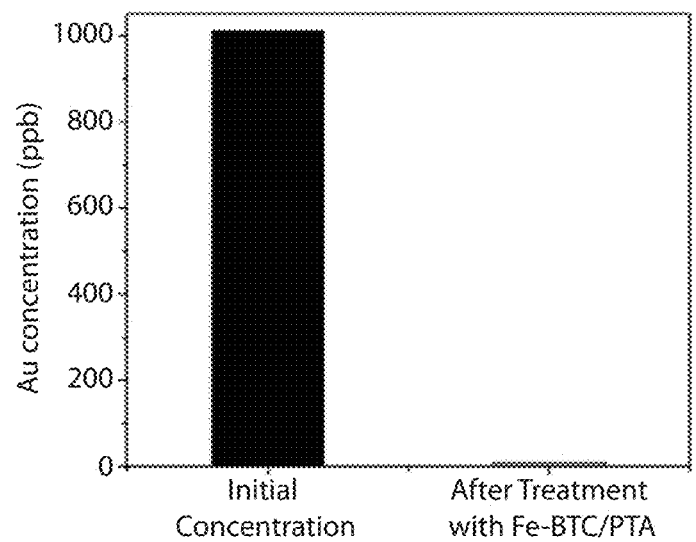
FIG. 16a illustrates the evolution of Au concentration in a 1 ppm $Au^{3+}$ aqueous solution comprising roughly 200000 ppb of Cu and Ni before and after treatment with Fe-BTC/PTA for 24 hours.
Figure 16B:
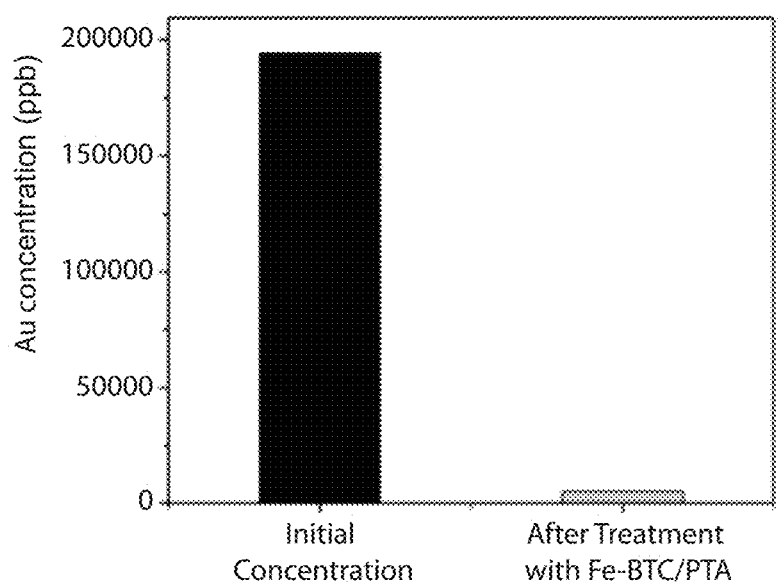
FIG. 16b illustrates the evolution of Au concentration in a roughly 200000 ppb $Au^{3+}$ aqueous solution comprising roughly 200000 ppb concentration of Cu and Ni before and after treatment with Fe-BTC/PTA for 24 hours.
Figure 16C:
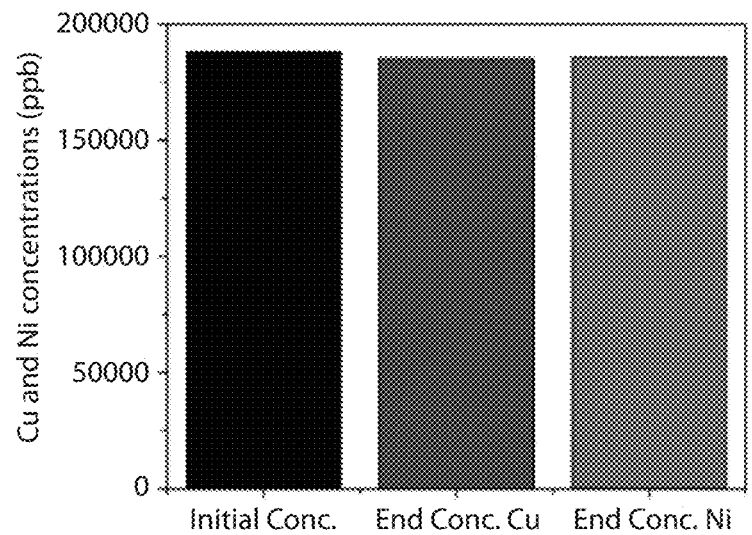
FIG. 16c illustrates the evolution of Cu and Ni concentration in a roughly 200000 ppb $Au^{3+}$ aqueous solution comprising roughly 200000 ppb concentration of Cu and Ni before and after treatment with Fe-BTC/PTA.

Further it was discovered that Fe-BTC/PTA can selectively remove over 99% of gold from a 1 ppm $Au^{3+}$ solution obtained from Milipore water (FIG. 16). For this experiment Millipore water was spiked with 1000 ppb of $Au^{3+}$ and 200000 ppb of $Cu^{2+}$ and $Ni^{2+}$. 20 mL of the solutions were treated with 10 mg of Fe-BTC/PTA for 24 hours. The results illustrate that the composite Fe-BTC/PTA exhibits high selectivity over high concentrations of these other common ions, copper and nickel.

To stress the selectivity capabilities of the Fe-BTC-redox polymer, the applicants have assessed its Au removal performance in the presence of high concentrations of abundant Cu and Ni seen in electroplating industry for example. To do so, Millipore water was spiked with 190000 ppb of $Au^{3+}$ and 200000 ppb of $Cu^{2+}$ and $Ni^{2+}$. 20 mL of the solutions were treated with 10 mg of Fe-BTC/PTA for 24 hours. Results are presented in FIG. 17. Fe-BTC/PTA removes over 99% of a roughly of 190000 ppb solutions of Au (FIG. 17) in the presence of roughly 200000 ppb of Cu and Ni, with little to no removal of Cu or Ni from water, as shown in FIG. 18.

At lower concentration, 1000 ppb of Au, the results are remarkable: Fe-BTC/PTA is capable of removing 99% of Au in the presence of roughly 200000 ppb concentration of Cu and Ni, as shown in FIG. 16. The concentration of Cu and Ni is 200 times the concentration of Au and there is no uptake of Cu or Ni. This implies the selectivities are tremendous.

After Fe-BTC/PTA, the ability of Fe-BTC/PpPDA to remove gold from water has also been studied more specifically.

The experiments of FIGS. 17*a* to 17*e* evaluate the capacity of Fe-BTC/PpPDA to extract gold from a simulated e-waste solution. Said solution is obtained by spiking the main components in e-waste including ~870 ppm of $Cu^{2+}$ and $Ni^{2+}$ and ~9 ppm of $Au^{3+}$ in a Rhone water solution that already contains many competing ions and organics.

Figure 17A:
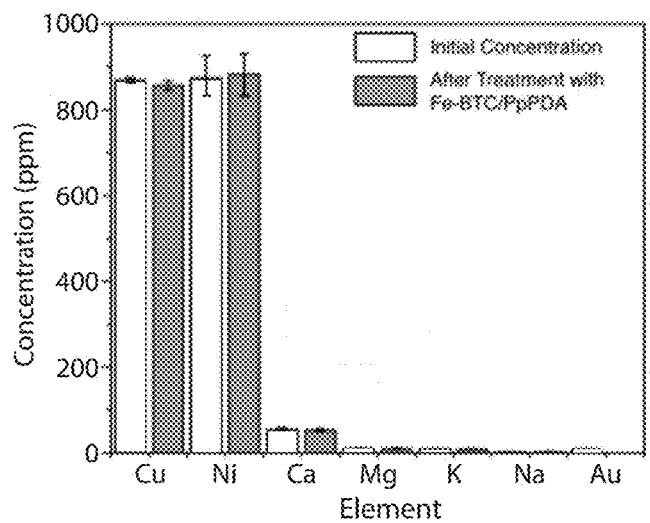
FIGS. 17a and 17b show the evolution of Cu, Ni, Ca, Mg, K, Na and Au concentration in a simulated e-waste solution before and after a 24 hours treatment with Fe-BTC/PpPDA.
Figure 17B:
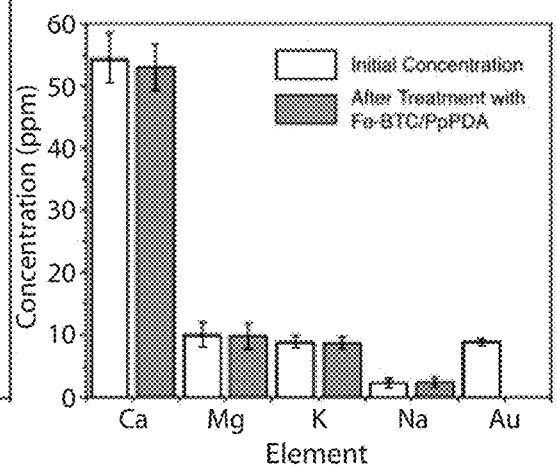

In the experiment of FIGS. 17*a* and 17*b*, 10 mg of Fe-BTC/PpPDA were added to a sample of 20 mL of said simulated e-waste solution. Then, they were placed in a thermo scientific maxQ4450 orbital shaker at 420 rpms and held at a constant temperature of 28° C. under shaking for 24 hours.

Figure 17C:
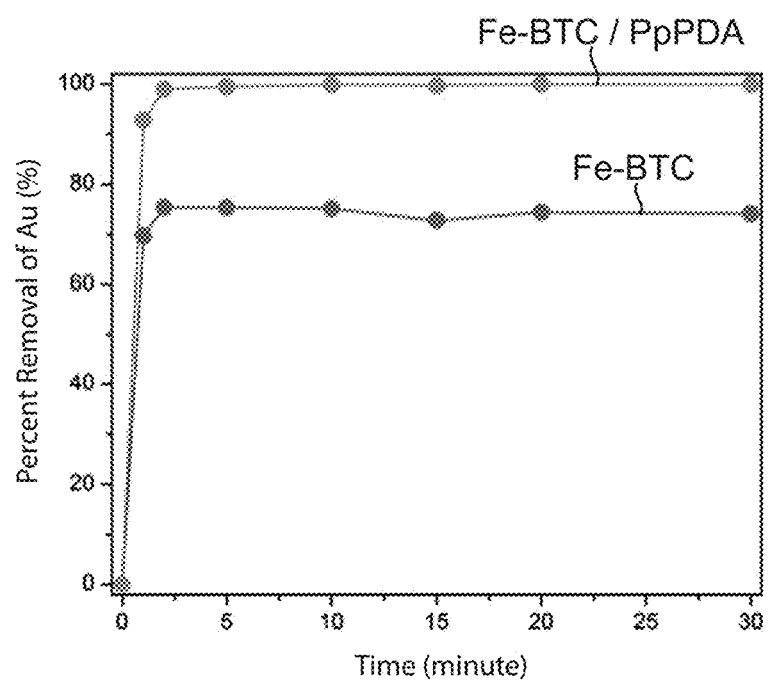
FIG. 17c illustrates the gold extraction speed of Fe-BTC and Fe-BTC/PpPDA in a simulated e-waste solution identical to that studied in FIGS. 17a and 17b.

For the experiment of FIG. 17*c*, a sample of 20 mL of the aforementioned simulated e-waste solution was treated with 10 mg of Fe-BTC/PpPDA. At each time point (1, 2, 5, 10, 15, 20 and 30 minutes), the aqueous samples were isolated and filtered using a 25 mm hydrophilic PTFE membrane syringe filter with 0.22 μm pores. After elemental analysis, the percent removal of gold was calculated.

The results of said experiments show that Fe-BTC and Fe-BTC/PpPDA remove 75% and 99.9% of the gold respectively (FIG. 17*c*) from said simulated e-waste solution, with a minimal uptake of the other ions (FIGS. 17*a* and 17*b*). The lack of uptake of the other ions is likely due to gold's higher reduction potential combined with higher polarizability when compared to the other ions present.

Further, as shown in FIG. 17*c*, like for Fe-BTC, for Fe-BTC/PpPDA the gold is extracted in less than 2 minutes. This remarkable rapid extraction rate is attributed to the extrinsic porosity of PpPDA introduced by the MOF template.

The Fe-BTC/PpPDA composite's extraction efficiency was also investigated at varying pH, within the same e-waste simulated solution. For this experiment, 10 mg of Fe-BTC/PpPDA was added to samples of 20 mL of the aforementioned e-waste solution with varying pH. For each sample the pH was adjusted using 0.02M aqueous solutions of HCl and NaOH and was then remeasured. The vials were placed in a Thermo Scientific MaxQ4450 Orbital Shaker for 24 hours at 420 rpms and held at a constant temperature of 28° C. The samples were then filtered using a mm hydrophilic PTFE membrane syringe filter with 0.22 μm pores to remove any solids for elemental analysis of the aqueous media.

Figure 17D:
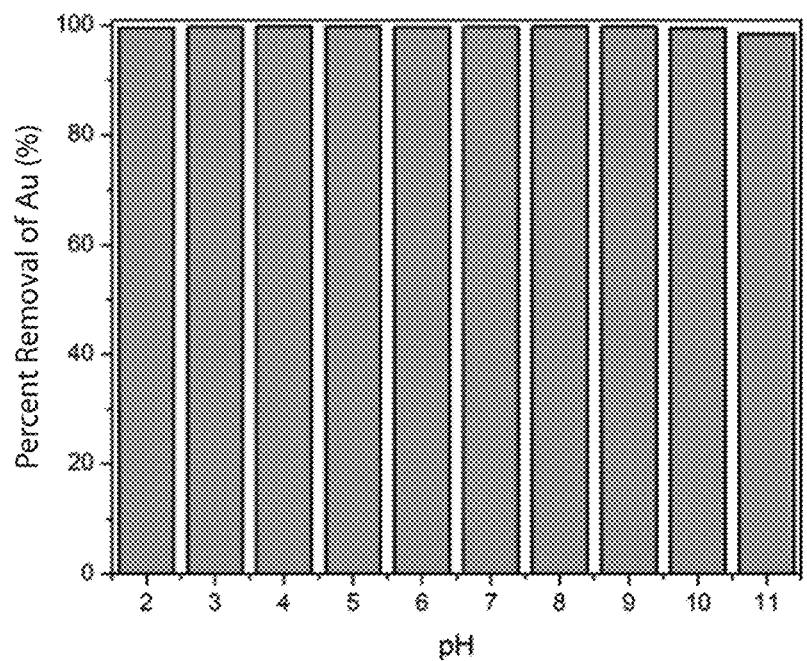
FIG. 17d shows the percent removal of gold in a simulated e-waste solution identical to that studied in FIGS. 17a and 17b at different pH after a 24 hours treatment with Fe-BTC/PpPDA.

The results of this experiment are shown in FIG. 17*d*. Remarkably, more than 99% removal is achieved for solutions between pH 2-10. At pH 11 gold removal is only slightly reduced to ~98%, indicating that at these concentrations, pH does not hinder the composite's extraction properties.

The aforementioned assessments indicate that the composite to Fe-BTC/PpPDA has the unprecedented selectivity and the relevant stability needed for various gold extraction processes.

While the material rapidly extracts $Au^{3+}$ (FIG. 17*c*), the quantity of gold compared to the composite mass is about 0.018 weight % which is quite low, due to low starting concentrations.

As such, the material must be able to concentrate gold over time or with regeneration for actual implementation into recovery processes. So, the regenerability of Fe-BTC/PpPDA was tested. The results of this experiment are shown in FIG. 17*e*.

For this experiment, 50 mg of Fe-BTC/PpPDA was exposed to a sample of 20 mL of previously mentioned simulated e-waste solution for five minutes. After said exposure the composite was removed from the solution and exposed to another sample of 20 mL of previously mentioned simulated e-waste solution for five more minutes, this process was repeated nine times. Then the composite Fe-BTC/PpPDA was soaked in ascorbic acid for four hours to reduce the imine ($=NH$) generated during $Au^{3+}$ reduction back to the amine ($—NH_2$) and then washed with ethanol. The regenerated Fe-BTC/PpPDA composite was again soaked successively ten more times into samples of the e-waste simulated solution, subsequently regenerated, and then washed. The same process was repeated one more time.

Figure 17E:
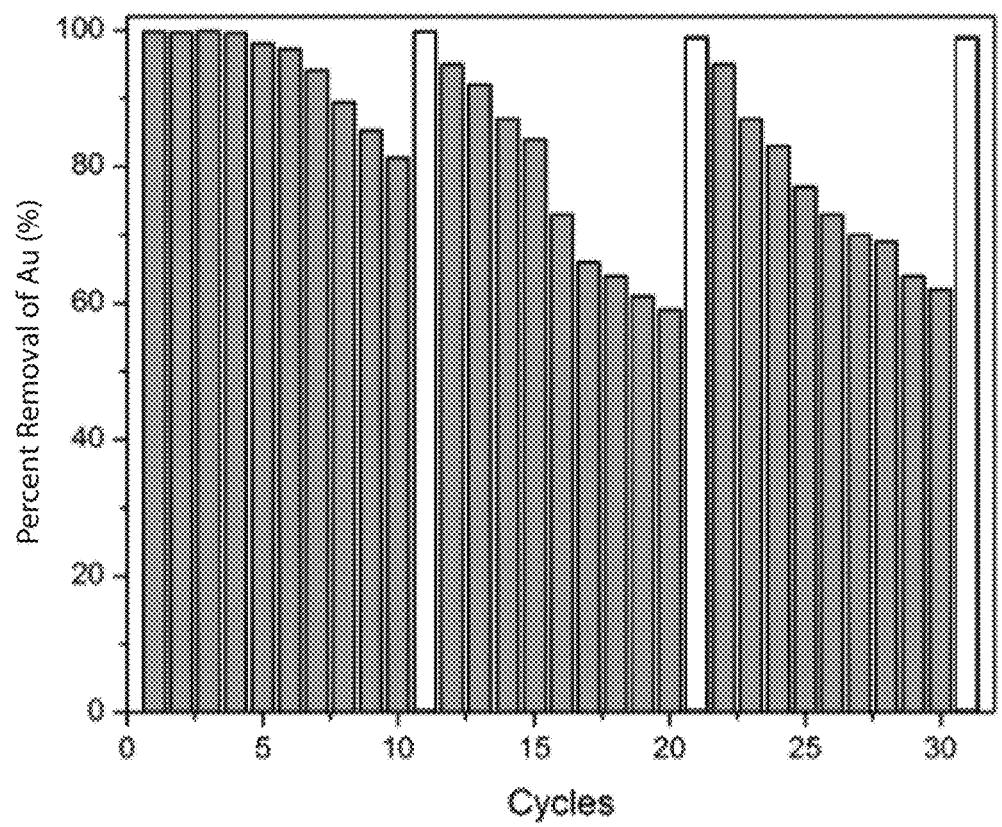
FIG. 17e shows the percent removal of gold by Fe-BTC/PpPDA after multiple exposures and regenerations using ascorbic acid in samples of a simulated e-waste solution identical to that studied in FIGS. 17a and 17b.

The results of this experiment are shown in FIG. 17*e*. In this figure, the grey bars correspond to successive cycles of exposure and every white bar constitutes regeneration with ascorbic acid. They reveal that the removal efficiency remained at 99% removal for four exposures. After cycle five, the removal efficiency decreases to 98% and after ten cycles to 81%. It should be noted that after each regeneration, 99% removal of $Au^{3+}$ is observed. However, there is a decrease in performance with continued exposure. This is likely due to a combination of material loss, decrease in extraction rate, and/or pore clogging as the gold is becoming more concentrated inside the composite.

After three regeneration cycles, the composite reclaimed 0.29 mg of $Au^0$ per mg of composite, a value that is readily increased with continued cycling.

The composite/Au powder resulting from the previously described experiment associated to FIG. 17*e* was loaded in an MTI OTF-1200X tube furnace and heated to 900° C. at a ramp of 30° C. per minute in air. The temperature was held for two hours and then allowed to cool to room temperature. The brown powder was transferred to a vial and 10 mL of concentrated HCl was added. The vial was loaded into a thermos scientific maxQ4450 orbital shaker at 420 rpms and held at a constant temperature of 28° C. for 24 hours. The Au particles were separated from the obtained yellow acidic solution and soaked in a fresh batch of concentrated HCl. The sample was allowed to shake at 420 rpms at a constant temperature of 28° C. for another 12 hours. The Au particles were then separated from the clear acidic solution and washed with distilled water 3 times. PXRD was performed to confirm neutral state gold. The purified Au was then dissolved in aqua regia and underwent subsequent elemental analysis to determine the purity. It was determined to be 23.9 karat which is very high purity.

The gold can also be concentrated over time. In order to demonstrate that, the applicant have placed 10 mg of Fe-BTC/PpPDA in 10 L of a solution containing ppm $Au^{3+}$. All of the gold was removed over a three-weeks period without regeneration steps. It means that the composite has extracted a weight of gold equal to about 80% of its mass. These results demonstrate that the Fe-BTC/PpPDA can concentrate metals also without regeneration step and that if simply soaked in large quantities of solutions with low concentrations of gold, the composite can still concentrate gold inside.

In order to confirm the effectiveness of the Fe-BTC/PpPDA composite for gold extraction from e-waste, gold was extracted from actual solutions obtained from e-waste. For this purpose, metals were mechanically removed from a computer processing unit (CPU), and then leached into an aqueous N-bromosuccinimide (NBS) and pyridine (Py) solution. It should be noted that, like ore extraction, gold extraction from e-waste is currently done using toxic alkali cyanide agents and/or extreme pH conditions. Here, a facile method that utilizes an aqueous solution of N-bromosuccinimide and pyridine at near neutral pH levels has been used (reference is made to the article «Environmentally Benign, Rapid, and Selective Extraction of Gold from Ores and Waste Electronic Materials» Angew. Chem. Int. Ed. 56, 9331-9335, (2017), Yue, C. et al.) This oxidative leaching process is more environmentally benign than the aforementioned methods. The resulting solution is a blue solution that had a metal composition of 1470 ppm $Cu^{2+}$, 95 ppm $Ni^{2+}$ and 7.3 ppm $Au^{3+}$.

Figure 18A:
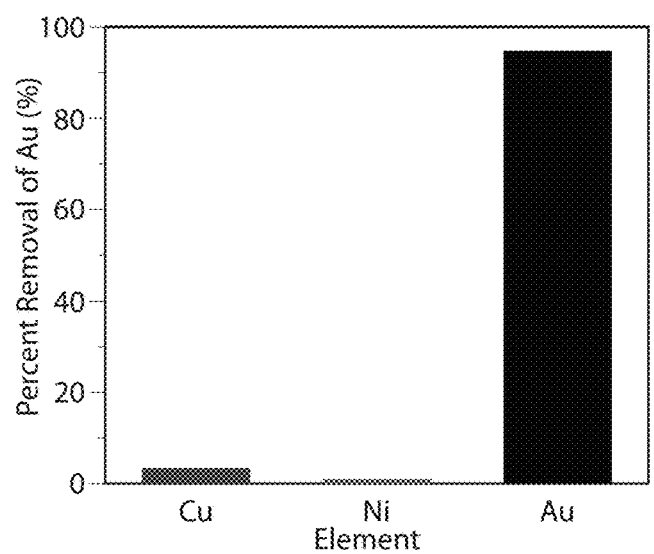
FIG. 18a shows the percent removal of gold from an electronic waste leaching solution after a thirty minutes treatment with Fe-BTC/PpPDA.
Figure 18B:
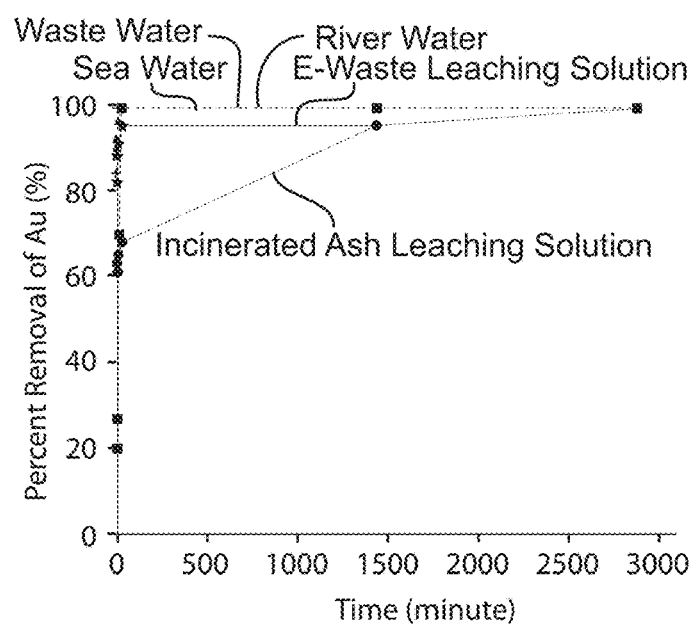
FIGS. 18b and 18c show the rate of gold removal from several matrices including the electronic waste leaching solution of FIG. 18a (with an initial gold concentration of 7.3 ppm), wastewater (with an initial gold concentration of 3.7 ppb), river water (with an initial gold concentration of around 120 ppb), sea water (with an initial gold concentration of 1 ppm), and of a solution obtained by treating incinerated sewage with NBS/Py (with an initial gold concentration of 5.47 ppm).
Figure 18C:
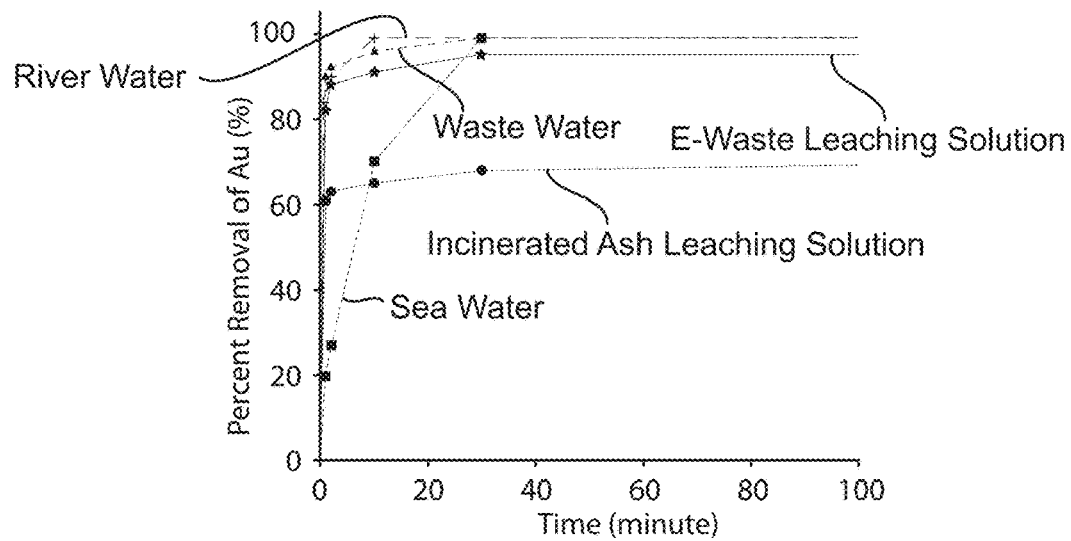

After soaking 30 mg of the composite Fe-BTC/PpPDA in a 20 mL sample of said blue solution, 86% gold removal was obtained in less than two minutes, over 90% in 10 minutes, and 95% removal in 30 minutes, as shown in FIGS. 18a and 18c. The composite Fe-BTC/PpPDA is over 662 times more selective for $Au^{3+}$ than $Cu^{2+}$ and $Ni^{2+}$ based on the calculated distribution coefficient, $k_d$, $1.3 \times 10^4$ mL/g, 19.13 mL/g, and 5.38 mL/g, respectively.

With continued cycling and subsequent composite removal, it is expected that the extracted gold metal will be free of other competing metals, as previously observed in river water (FIG. 17a-17e). Hence, it is concluded that Fe-BTC/PpPDA has great potential for Au recovery from e-waste.

The applicants have also studied the rate of gold removal from several matrices including river water, wastewater, electronic waste leaching solution, sea water, and a solution obtained after treating incinerated sewage with NBS/Py.

For the experiment in river water, 10 mg of Fe-BTC/PpPDA were soaked in 20 mL of a solution comprising Rhone river water spiked with 120 ppb of $Au^{3+}$, for various periods of time. After the time point was reached the sample was filtered and elemental analysis was done to calculate the % removal of gold. Such a concentration of 120 ppb of Au approaches the gold concentration in Alaskan river which is usually between 60 and 120 ppb. Indeed, mining operations near the fresh water sources tend to discharge metal ions into the environment.

For the experiment in waste water, 10 mg of Fe-BTC/PpPDA were soaked in mL of a solution of waste water that contained 3.7 ppb Au received from a waste water treatment plant in Switzerland, for various periods of time. After the time point was reached the sample was filtered and elemental analysis was done to calculate the % removal of gold.

For the experiment in electronic waste leaching solution, 30 mg of Fe-BTC/PpPDA were soaked in 20 mL of a solution of electronic waste water obtained by oxidizing and hence dissolving the metals extracted from a CPU in a NBS/Py solution (same solution as the one studied in FIG. 18a), for various periods of time. Said solution of NBS/Py had 1470 ppm $Cu^2$, 95 ppm $Ni^{2+}$ and 7.3 ppm $Au^{3+}$. After the time point was reached the sample was filtered and elemental analysis was done to calculate the % removal of gold.

For the experiment in Mediterranean sea water, 10 mg of Fe-BTC/PpPDA were soaked in 20 mL of Mediterranean sea water spiked with 1 ppm $Au^{3+}$, for various periods of time. Said Mediterranean sea water had many other complex ions in the solution including Ca, Mg, Na, K, Sr, B and Pb. After the time point was reached the sample was filtered and elemental analysis was done to calculate the % removal of gold. We find that the final concentration of $Au^{3+}$ is below our detectable limit, indicating it is less than 100 ppt.

Figure 18D:
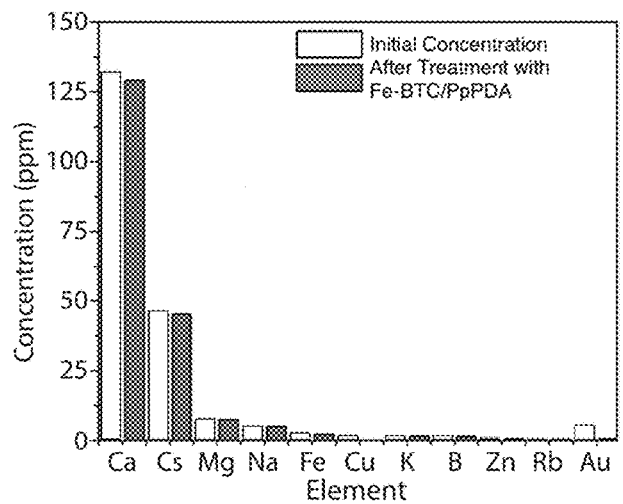
FIGS. 18d and 18e show the evolution of Ca, Cs, Mg, Na, Fe, Cu, K, B, Zn, Rb and Au concentration in a solution obtained by treating incinerated sewage with NBS/Py identical to that studied in FIGS. 18b and 18c, before and after a 24 hours treatment with Fe-BTC/PpPDA.
Figure 18E:
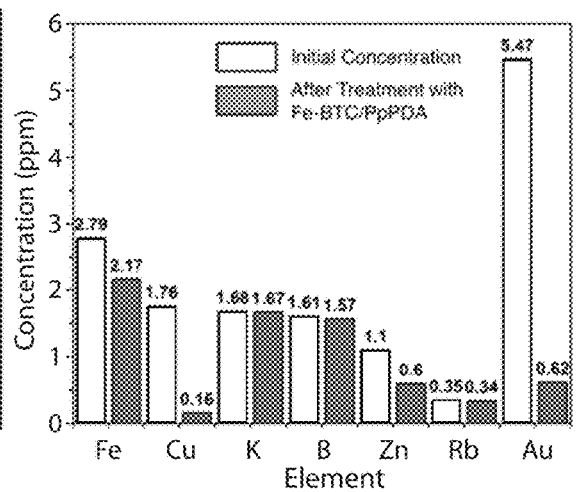

For the experiment in incinerated ash leaching solution, 50 mg of Fe-BTC/PpPDA were soaked in 10 mL of an incinerated ash leaching solution for various periods of time. Said solution comes from a treatment plant in Switzerland and the NBS/Py previously mentioned method was used to extract the metals. The resulting solution contained 5.47 ppm of $Au^{3+}$ and many other species such as $Ca^{2+}$, $Cs^+$, $Mg^{2+}$, $Na^+$, $Fe^{3+}$, $Cu^{2+}$, $K^+$, $B^{3+}$, $Zn^{2+}$ and $Rb^+$. After the time point was reached the sample was filtered and elemental analysis was done to calculate the % removal of gold. FIGS. 18d and 18e show the identity and concentrations of the metals present in said incinerated ash leaching solution before and after a 24 hours treatment with said Fe-BTE/PpPDA.

The percents removal of gold over time resulting from the five experiments mentioned above are illustrated in FIGS. 18b and 18c.

Concerning waste water, the results show that, in less than 1 minute 90% removal is achieved, and in under 30 minutes over 99% of $Au^{3+}$ was extracted from the wastewater solution and the final concentration was <10 ppt. This extraction is truly remarkable, particularly considering the high concentrations of organics in wastewater, which often competitively complex metal ions and also often foul mesoporous adsorbents.

Concerning the incinerated ash leaching solution, the results show that in less than two minutes, the composite Fe-BTC/PpPDA is able to extract 61% of the $Au^{3+}$ from the solution and then reaches 90% removal in 24 hours. Moreover, it can be observed little to no uptake of most of the other metal interferents present, as shown in FIGS. 18d and 18e. Although the $Cu^{2+}$ concentration is decreased from 1.76 ppm to 0.16 ppm, the removal capacity is quite low. Further, $Cu^{2+}$ is readily desorbed, and hence will not influence the gold purity.

Regarding the river water solution, remarkably, in less than 2 minutes the applicants have observed 90% Au extraction and then 99% removal in less than 30 minutes in the solution indicating that Fe-BTC/PpPDA could be implemented in mining Au from surface water sources.

One of the most difficult challenges is gold recovery from the sea. Indeed, it is estimated that the ocean contains gold valued at 720 trillion US dollars. But, unfortunately, gold in seawater has an ultra-low concentration, less than 20 ppt, and is one of the most complex matrices in the world. For example, competing ions, such as $Na^+$ can have concentrations that are $2 \times 10~9$ times higher than that of $Au^{3+}$. As such, extraction of the precious metal from the sea is conceptually thought to be nearly impossible. The experiment conducted for FIGS. 18b and 18c in Mediterranean Sea water spiked with 1 ppm $Au^{3+}$ showed that Fe-BTC/PpPDA is able to extract 95% of the gold in 20 minutes and then reached more than 99% removal in 30 minutes. It should be noted that given the complexity of the solution, it was not possible to obtain the remaining concentration of gold in the seawater. However, it is below 100 ppt based on the detection limit of the ICP-MS method. As this value is approaching the gold concentration in the sea, the applicants daringly attempted to concentrate Au directly from the ocean. For this, 0.5 g of Fe-BTC/PpPDA was soaked in the ocean for 1 week off the coast of Jacksonville Florida, USA. The sample was then recovered, dried and digested in aqua regia to determine if any Au was extracted while soaking. The post-treated sample was found to contain 0.01 wt % Au. While this is a small amount, with much longer soak times and subsequent regeneration, composites like Fe-BTC/PpPDA might bring new found optimism towards even mining Au from the sea.

Another compound has been made by functionalizing a porous template "Cu-BTC" by in-situ polymerization of bio-derived para-phenylenediamine onto the internal surface of the pores of Cu-BTC, thereby introducing extrinsic porosity to the intrinsically non-porous polymer PpPDA and obtaining Cu-BTC/PpPDA.

Figure 22:
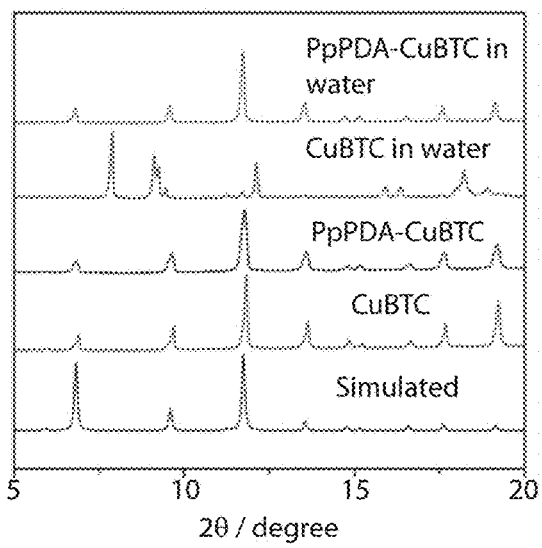
FIG. 22 shows powder X-ray diffraction patterns of the porous template HKUST-1 (also known as Cu-BTC). The template was soaked in para-Phenylenediamine (pPDA) leading to polymerized poly-para-phenylenediamine (PpPDA). Cu-BTC and Cu-BTC/PpPDA were soaked in water for 7 days.

FIG. 22 shows powder X-ray diffraction patterns of the porous template HKUST-1 (also known as Cu-BTC). The template was soaked in para-Phenylenediamine (pPDA) leading to polymerized Poly-para-phenylenediamine (PpPDA). Cu-BTC and Cu-BTC/PpPDA were soaked in water for 7 days. The diffraction patterns show that the polymerization process enhances the stability of the Cu-BTC porous template in water.

Figure 23:
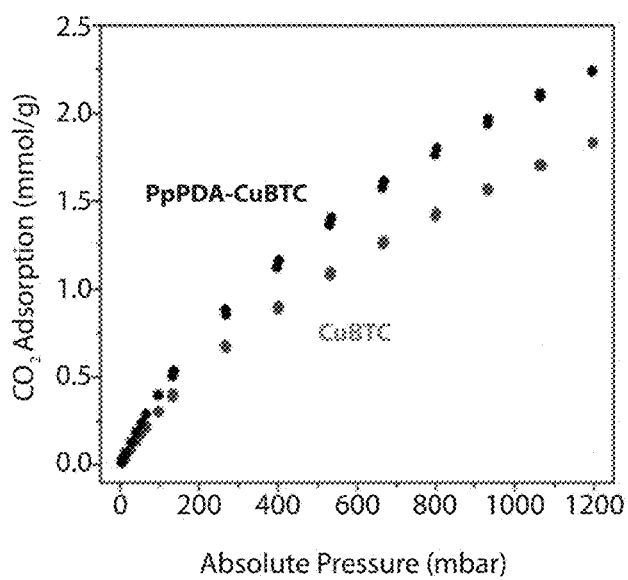
FIG. 23 shows $CO_2$ adsorption isotherms at 25° C. for Cu-BTC and Cu-BTC/PpPDA.

FIG. 23 $CO_2$ adsorption isotherms at 25° C. for Cu-BTC and Cu-BTC/PpPDA. Cu-BTC and Cu-BTC/PpPDA were degassed under vacuum at 125° C. for hours at a ramp rate of 1.0° C. per minute. After activation, adsorption experiments were performed at 25° C. using a water bath. It is observed that Cu-BTC/PpPDA has an enhancement in $CO_2$ adsorption at ambient temperatures compared to HKUST-1. The increase in adsorption at low pressures illustrates that the binding energy of $CO_2$ increased compared to Cu-BTC.

Figure 24A:
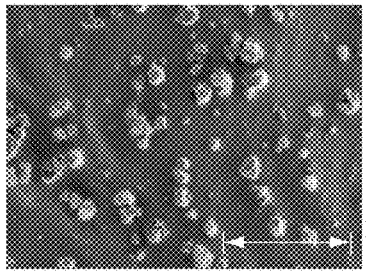
FIGS. 24a and 24b show scanning electron microscopy of the porous template Cu-BTC and FIG. 24c shows scanning electron microscopy of the same Cu-BTC/PpPDA. Scale bars in FIGS. 24a, 24b and 24c all correspond to 1000 nm.
Figure 24B:
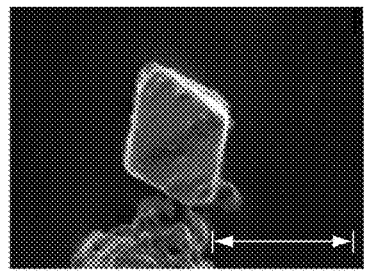
Figure 24C:
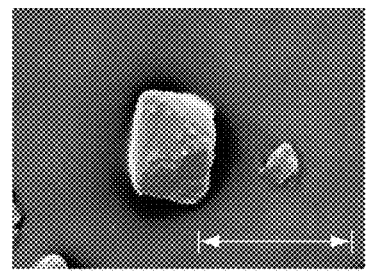

Images of FIGS. 24a,b and c imply the polymer is going inside of the porous template.

These results show that the polymerization of para-phenylenediamine onto the surface of the pores of Cu-BTC can also enhance its stability in water.

The applicants have also tested Fe-BTC/PDA composite for extraction of Pb from water sample. As the standard reduction potential of Pb is much lower it was not expected to observe a reduction reaction.

In a first experiment (see FIG. 3a), the applicants have determined the rate of lead removal. For this experiment, a solution of $Pb^{2+}$ was treated with Fe-BTC or Fe-BTC/PDA over a period of an hour. For each experiment, 20 mL of Millipore water containing 1 ppm of $Pb^{2+}$ were treated with 20 mg of Fe-BTC or 20 mg of Fe-BTC/PDA. In the solution treated with Fe-BTC/PDA, over 99% of lead is removed to reach drinkable limits in less than a minute.

In a second experiment (see FIG. 3b), the applicants have determined the lead removal capacity at low Pb concentrations. Fe-BTC or Fe-BTC/PDA were soaked in Millipore water spiked with lead for 24 hours. For the experiment ~10 mg of Fe-BTC or ~10 mg Fe-BTC/PDA were added to 20 mL of a 0.9 ppm solution of $Pb^{2+}$.

Figure 3A:
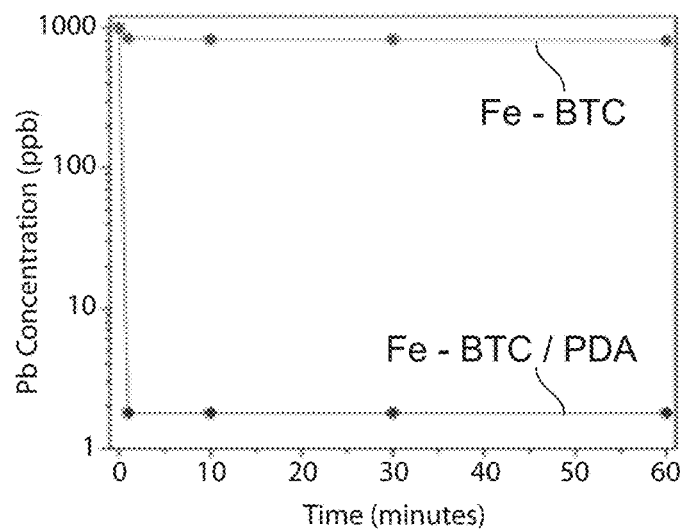
FIG. 3a shows the result of evolution of the Pb concentration over a period of an hour after introduction of FeBTC or Fe-BTC/PDA in a 1 ppm Pb$^{2+}$ aqueous solution.
Figure 3B:
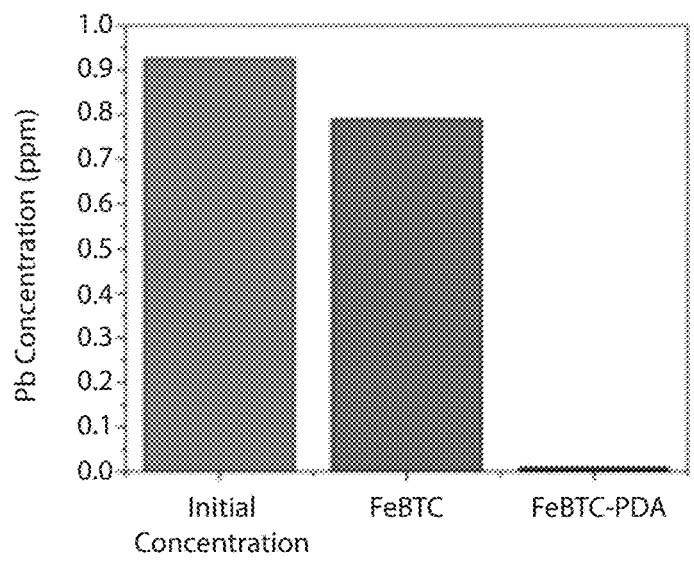
FIG. 3b is a graph showing the evolution of lead concentration in a 0.9 ppm Pb$^{2+}$ aqueous solution after introduction of Fe-BTC or Fe-BTC/PDA for 24 hours.

The results of these experiments are presented in FIGS. 3a and 3b and show the rapid and selective removal of lead from water samples containing high concentration of $Pb^{2+}$. The composite Fe-BTC/PDA binds up to 394 mg $Pb^{2+}$ per gram of composite, and removes over 99% of $Pb^{2+}$ ions from a 1 ppm solution to yield drinkable levels in less than a minute (see FIG. 3a).

Therefore, the applicants have discovered that Fe-BTC/PDA is able to efficiently reduce the concentration of Pb in water. X-ray diffraction experiments have been made and have shown no other lead compound. These results seem to confirm that the mechanism of action of the composite Fe-BTC/DPA for extraction of Pb from water is different from the aforementioned reduction process observed for $Hg^{2+}$ and various precious metals.

Figure 3C:
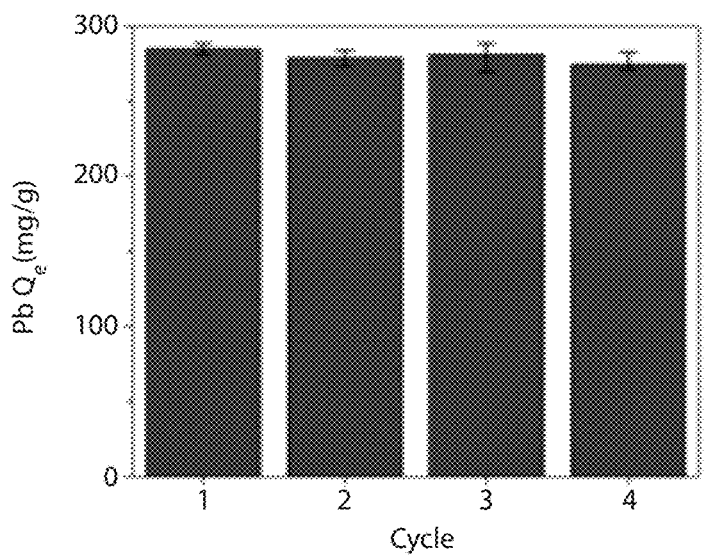
FIG. 3c shows lead removal capacity vs cycle number.

The composite Fe-BTC/PDA has also proven to be easily regenerated and cycleable in this context, as illustrated by the results of FIG. 3c. For this experiment, g of Fe-BTC/PDA was added to a 1 L solution of Milipore water spiked with 1000 ppm of $Pb^{2+}$. The remaining $Pb^{2+}$ concentration in the aqueous media were analyzed to determine the lead capacity (Qe, mg/g). The Fe-BTC/PDA sample was then added to 0.001 M solutions of EDTA (ethylenediaminetetracetic acid). The samples were filtered, washed with methanol, dried and weighed. The regenerated composites were then added to 1000 ppm solutions of $Pb^{2+}$ again. This procedure was repeated three more times to obtain the capacity Qe (mg/g) for each of the four cycles.

Concerning Pb extraction, other experiments have been made in order to study the selectivity of the porous template Fe-BTC and of the composites Fe-BTC/PDA, Fe-BTC/PTA, Fe-BTC/PHQ, Fe-BTC/PpPDA and Fe-BTC/PBDT, it means their ability to extract Pb from water comprising other common ions such as Na, Mg, Ca, Sr and K and organics.

Figure 20A:
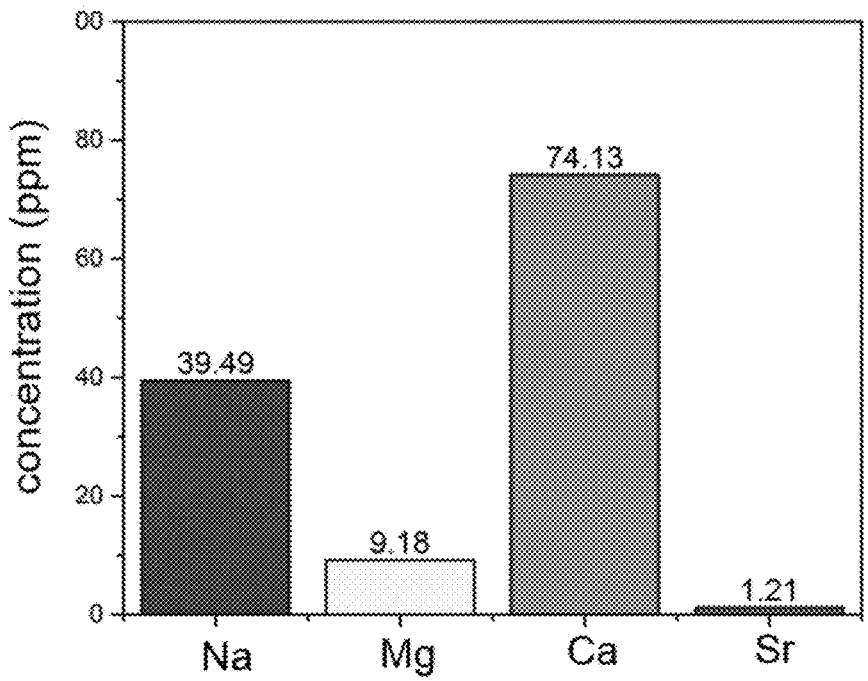
FIG. 20a shows the concentration of Na, Mg, Ca and Sr in a Rhone river water sample.
Figure 20B:
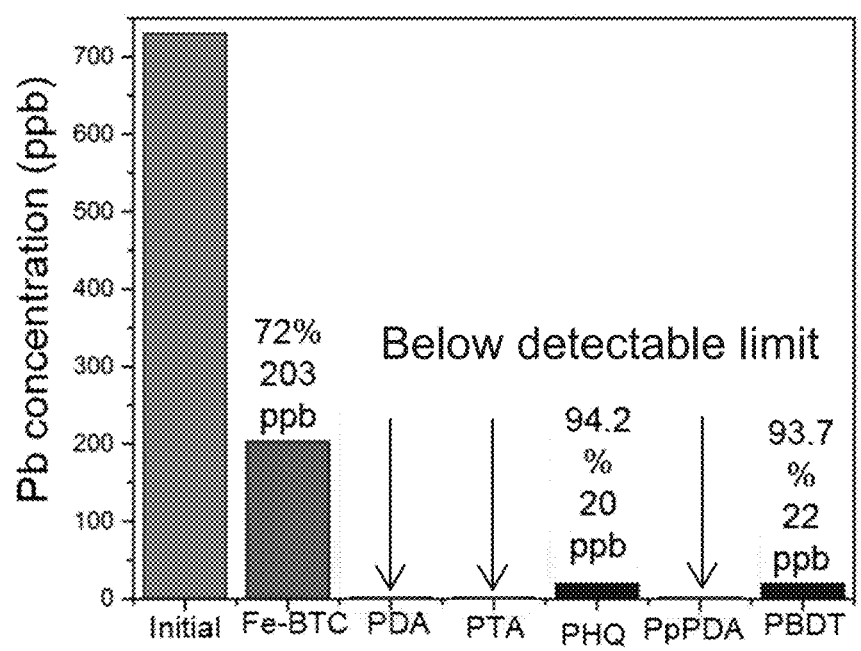
FIG. 20b shows the concentration of lead in the Rhone River water sample of FIG. 20a after treatment with Fe-BTC or with composites Fe-BTC/PDA, Fe-BTC/PTA, Fe-BTC/PHQ, Fe-BTC/PpPDA or Fe-BTC/PBDT.

A first experiment has been made in a sample of Rhone river water comprising an initial concentration of Pb around 700 ppb and 39.49 ppm Na, 9.18 ppm Mg, 74.13 ppm Ca and 1.21 ppm Sr (FIGS. 20a and 20b). For FIG. 20b, 10 mg of Fe-BTC or the composites Fe-BTC/PDA, Fe-BTC/PTA, Fe-BTC/PHQ, Fe-BTC/PpPDA or Fe-BTC/PBDT were soaked in 20 mL of Rhone River water spiked with 700 ppb of lead for 24 hours. Results of FIG. 20b show that Fe-BTC is able to remove 72% of Pb, while Fe-BTC/PDA, Fe-BTC/PTA and Fe-BTC/PpPDA are able to extract over 99% of Pb (below detectable limit) and Fe-BTC/PHQ and Fe-BTC/PBDT are able to remove more than 93% of Pb. It means that almost all the studied composites reduce the concentration of $Pb^{2+}$ to what is deemed drinkable by the Environmental Protection Agency in the presence of other chemical species present in the river water (FIG. 20a).

Figure 21A:
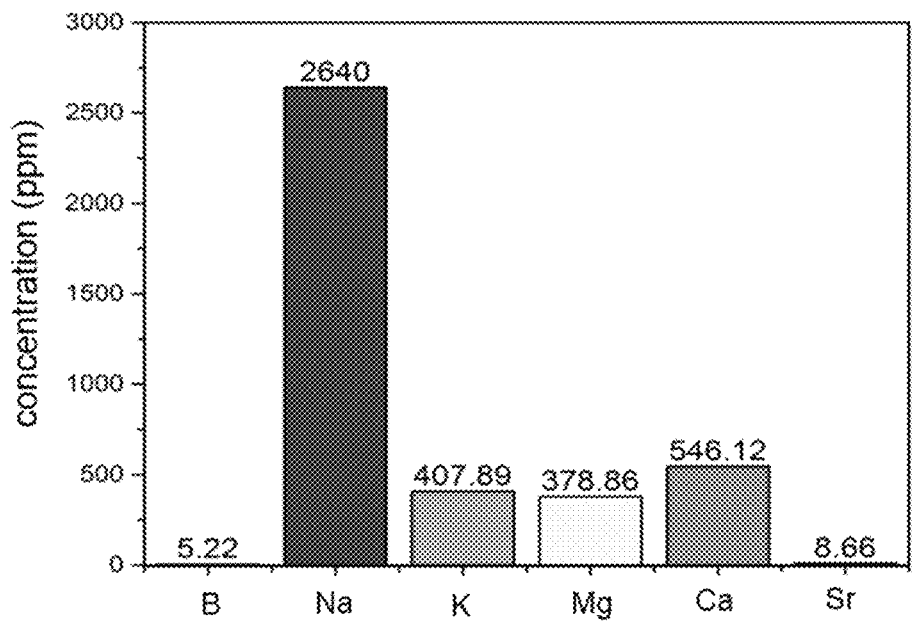
FIG. 21a shows the concentration of B, Na, K, Mg, Ca and Sr in a Mediterranean Sea water sample.
Figure 21B:
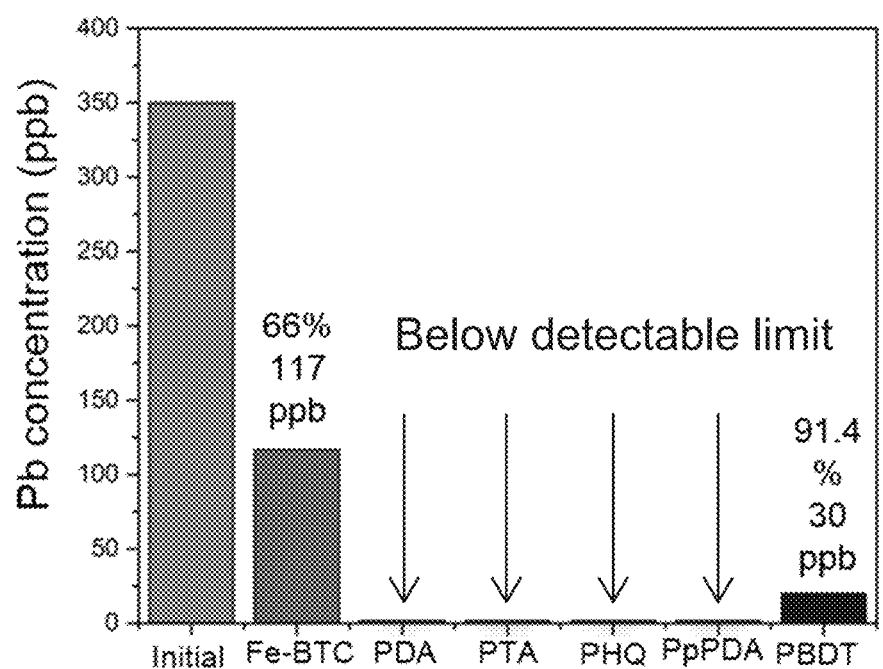
FIG. 21b shows the concentration of lead in the Mediterranean Sea water of FIG. 21a after treatment with Fe-BTC or with composites Fe-BTC/PDA, Fe-BTC/PTA, Fe-BTC/PHQ, Fe-BTC/PpPDA or Fe-BTC/PBDT.

A second experiment has been conducted in Mediterranean Sea water. For this experiment (FIG. 21b), 10 mg of Fe-BTC or the composites Fe-BTC/PDA, Fe-BTC/PTA, Fe-BTC/PHQ or Fe-BTC/PpPDA were soaked in 20 mL of Mediterranean Sea water spiked with 350 ppb of lead for 24 hours. The results show that Fe-BTC/PDA, Fe-BTC/PTA, Fe-BTC/PHQ, Fe-BTC/PpPDA are able to remove over 99% (below detectable limit) of Pb a roughly of 350 ppb solution of Pb in the presence of 2640 ppm of Na, 407.89 of Cu, 378.86 ppm of Mg, 546.12 ppm of Ca, 8.66 ppm of Sr and 5.22 ppm of B, as shown in FIGS. 21a and 21b. Fe-BTC/PBDT is able to remove 91.4% of Pb of this same solution. That is to say, almost all the studied composites reduce the concentration of $Pb^{2+}$ to what is deemed drinkable by the Environmental Protection Agency in the presence of other chemical species present in the Mediterranean Sea water, refer to FIG. 21a.

These experiments show that the studied composites adsorb a significant amount of lead. In most composites it is possible to get below the EPA limit of lead in water in both Rhone river water and sea water. These graphs show high selectivity as there are many other ions in solution that compete with lead.

The applicants have also studied the efficiency of the composite according to the invention for extraction of some specific chemical species from a gas medium.

Figure 19:
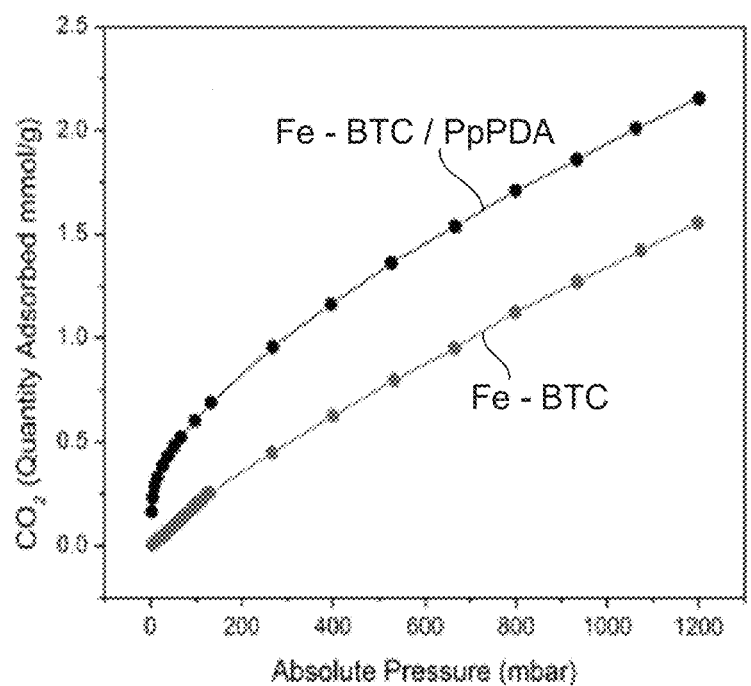
FIG. 19 shows $CO_2$ adsorption isotherms at 25° C. for Fe-BTC and Fe-BTC/PpPDA.

FIG. 19 shows $CO_2$ adsorption isotherms at 25° C. for Fe-BTC and Fe-BTC/PpPDA. Fe-BTC and Fe-BTC/PpPDA were degassed under vacuum at 125° C. for 15 hours at a ramp rate of 1.0° C. per minute. After activation, adsorption experiments were performed at 25° C. using a water bath. It is observed that Fe-BTC/PpPDA has an enhancement in $CO_2$ adsorption at ambient temperatures compared to Fe-BTC. The increase in adsorption at low pressures illustrates that the binding energy of $CO_2$ increased compared to Fe-BTC. Therefore the composites according to the invention show high promise for air purification. It seems possible to change the binding energy of certain small molecules with different polymers.

The introduction of porosity to redox active polymers has shown improvements in chemical separation of metals in water but also has shown an enhancement in small molecule gas adsorption and framework stability as well.

In view of these results, the applicants believe that the composites according to the invention will be good for adsorption of $Cl_2$ gas, ozone, ammonia, and also volatile organics compounds from air. It is to be expected that with the high reduction potential of $Cl_2$ or ozone that the composites according to the invention would be very efficient for scrubbing toxic chlorine gas or ozone from air.

Moreover, it is known that volatile organic compounds (VOCs) are well absorbed by intrinsically porous polymers (polymers that are naturally porous), as mentioned for example in the publication "Rapid removal of organic micropollutants from water by β-cyclodextrin polymer", Alsbaiee et al. 2016—doi:10.1038/nature16185. And, as demonstrated by the applicants, it is possible to introduce extrinsic porosity to polymers using a porous template. For these reasons, it is supposed that the composites according to the present invention would also be efficient in extracting VOCs from both air and water.

According to the invention, VOCs are typically chosen among ethanol, methanol, butanone, ethylbenzene, acetone, n-hexane, cyclohexane, toluene, benzene, various xylenes, dichloromethane and n-butylamine, benzothiophene, thioanisole, Methyl tert-butyl ether, Dibromochloropropane, Chloroform, Perchloroethane, 1,1,1-Trichloroethane, 1,2-chloropentane, ethylene dibromide, 1,2-Dichloroethene, Vinyl chloride, Dichlorodofluoromethane, Decabromodiphenyl ether, Trichloroethylene (TCE), organochlorine insecticides (DDT).

The methods that have been used in order to synthesize Fe-BTC, Fe-BTC/PDA, Fe-BTC/PTA, Fe-BTC/PpPDA, Fe-BTC/PHQ, Fe-BTC/PBDT and Cu-BTC are described in details below. The method to obtain the compound of interest Fe-BTC/PDHAA is also disclosed.

As mentioned before other MOFs such as Cu-TDPAT and Al-BDC-$NH_2$ can be used in the context of this invention. Methods for obtaining them are also disclosed.

Synthesis of Fe-BTC (Porous Template)

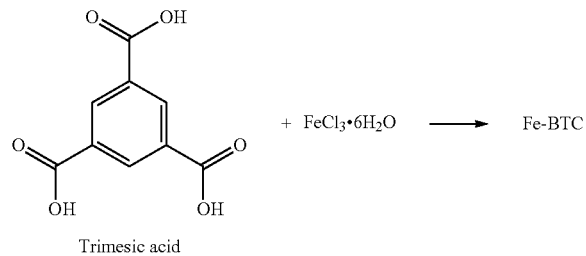 [SMILES: O=C(O)c1cc(C(=O)O)cc(C(=O)O)c1 ; "FeCl3·6H2O" ; "Fe-BTC"]

Iron(III) chloride hexahydrate ($FeCl_3 \cdot 6H_2O$), 97% was bought from Alfa Aesar and 1,3,5-benzenetricarboxylic acid (trimesic acid, BTC), 98% was bought from ABCR GmbH and used without further purification. 19.44 g of iron(III) chloride hexahydrate, 6.72 g of trimesic acid and 240 mL of distilled water were loaded in a 1 L teflon reactor.

The reactor was placed in a 1200 watts Milestone SynthWAVE Microwave Single Reaction chamber and pressurized to 5 bars with nitrogen. The reaction was heated to 130° C. over 5 min and remained at the temperature for 60 mins. After the reaction was cooled down to room temperature the orange solid was filtered under vacuum and washed with copious amounts of water and methanol. The resulting powder was loaded into a double thickness whatman cellulose extraction thimble and underwent soxhlet purification with methanol for 24 hours. After purification the sample was dried under vacuum overnight. The material was activated under vacuum at 150° C. for 17 hours before nitrogen adsorption and standard characterization.

Free Base Dopamine Synthesis (Monomer for PDA)

Dopamine HCl, dry sodium hydride 95% and anhydrous solvents were bought from Sigma Aldrich and used without further purification. In a $N_2$ purged, 2-neck round bottom flask, 10 g of Dopamine HCl was mixed with 80 mL of anhydrous tetrahydrofuran (THF) and 80 mL of anhydrous methanol. 1.264 g of dry sodium hydride 95% was added slowly in small quantities over a period of approximately 15 minutes. The reaction mixture was allowed to stir for 48 hours with flowing $N_2$. After the completion of the reaction, the mixture was filtered under vacuum and washed with copious amounts of THF. The white powder was dried and kept under vacuum until further use.

$^1$H NMR (400 MHz, Methanol-d4): δ=6.72 (d, J=8.0 Hz, 1H), 6.67 (d, J. 2.1 Hz, 1H), 6.55 (dd, J. 8.0, 2.1 Hz, 1H), 2.87 (t, J=7.1 Hz, 2H), 2.65 (t, J=7.1 Hz, 2H)

Synthesis of Fe-BTC/PDA (Polydopamine)

Fe-BTC was activated at 150° C. under vacuum overnight in a 500 mL 2-neck round bottom flask using a schlenk line and an oil pump. After activation of Fe-BTC, the reaction vessel was cooled to room temperature and then $N_2$ was flowed over the sample for 10 minutes. After the sample was sealed under an inert atmosphere, 400 mL 0.02 M anhydrous methanol solution containing the as-prepared free base dopamine, was prepared in a glove box purged with $N_2$. Using a steel cannula and $N_2$, the methanol/dopamine solution was transferred to the flask containing the activated Fe-BTC. Over a period of 1 hour, the orange powder turned dark purple indicative of polymerization. The reaction was allowed to stir for 24 hours at room temperature under an inert atmosphere. After completion, the reaction mixture was filtered under vacuum and washed with copious amounts of methanol and water. To remove any excess dopamine, the resulting purple powder was loaded into a double thickness Whatman cellulose extraction thimble, and the composite underwent soxhlet extraction with methanol for 24 hours under $N_2$. Afterwards, the sample was dried under vacuum at room temperature over night, and then the material was activated under vacuum at 125° C. for 17 hours before nitrogen adsorption and standard characterization.

Elemental Analysis Fe-BTC/PDA-19: C, 39.553%; N, 1.81%; H, 2.45%; Fe, 17.84%

Synthesis of Fe-BTC/PTA (Polytyramine)

Tyramine 99% and anhydrous solvents were bought from Sigma Aldrich without further purification. 2 g of Fe-BTC was activated at 150° C. under vacuum overnight in a 500 mL 2-neck round bottom flask using a schlenk line and an oil pump. After activation, the reaction was cooled to room temperature and then $N_2$ was flowed over the sample. A 400 mL anhydrous ethanol 0.06 M solution of tyramine was prepared in a nitrogen purged glove box. Using a steel cannula and $N_2$, the ethanol/tyramine solution was transferred to the flask containing the activated Fe-BTC. The orange powder turned dark purple indicative of polymerization. The reaction was allowed to stir for 24 hours at room temperature under an inert atmosphere. After completion, the reaction mixture was filtered under vacuum. Once dry the sample was placed in a vacuum oven and heated at 125° C. over night. The material was activated under vacuum at 125° C. for 17 hours before nitrogen adsorption and standard characterization.

Synthesis of Fe-BTC/PpPDA para-phenylenediamine >99% and anhydrous solvents were bought from Sigma Aldrich without further purification. 0.300 g of Fe-BTC was activated at 150° C. under vacuum overnight in a 100 mL 2-neck round bottom flask using a schlenk line and an oil pump. After activation, the sample was cooled to room temperature and then $N_2$ was flowed over the sample. 0.384 g of pphenylenediame was added to 50 mL anhydrous methanol in a nitrogen purged glove box. Using a steel cannula and $N_2$, the ethanol/para-phenylenediamine solution was transferred to the flask containing the activated Fe-BTC. The orange powder turned dark purple indicative of polymerization. The reaction was allowed to stir at room temperature under an inert atmosphere for 24 hours. After completion, the powder was recovered using vacuum filtration. The material was activated under vacuum at 125° C. for 17 hours before nitrogen adsorption and standard characterization.

Synthesis of Fe-BTC/PHQ

Hydroquinone 99.5% and anhydrous solvents were bought from Sigma Aldrich without further purification. 0.2 g of Fe-BTC was activated at 150° C. under vacuum overnight in a 100 mL 2-neck round bottom flask and schlenk line and an oil pump. After activation, the sample was allowed to cool to room temperature and then $N_2$ was flowed over the sample. 0.869 g of hydroquinone was added to 50 mL of anhydrous ethanol in nitrogen purged glove box. Using a steel cannula, and $N_2$, the ethanol/hydroquinone solution was transferred to the reaction flask containing Fe-BTC. The reaction was allowed to stir for 1 hour to allow the monomers to diffuse through the porous system. After the diffusion of the monomers equilibrated, 1.5 mL of 25% $NH_3$ in water was added to the reaction vessel with a syringe. The orange powder turned dark purple indicative of polymerization. The reaction was allowed to stir at room temperature under an inert atmosphere for 24 hours. After completion, the powder was recovered using vacuum filtration. The material was activated under vacuum at 125° C. for 17 hours before nitrogen adsorption and standard characterization.

Synthesis of Fe-BTC/PBDT 1,4-benzenedithiol 99% and anhydrous solvents were bought from Sigma Aldrich without further purification. 0.2 g of Fe-BTC was activated at 150° C. under vacuum overnight in a 100 mL 2-neck round bottom flask and schlenk line and an oil pump. After activation, the sample was allowed to cool to room temperature and then $N_2$ was flowed over the sample. 0.056 g of 1,4-benzenedithiol was added to 50 mL of ethanol in a nitrogen purged glove box. Using a steel cannula, and $N_2$, the ethanol/1,4-benzenedithiol solution was transferred to the reaction flask containing Fe-BTC. The reaction was allowed to stir for 1 hour to allow the monomers to diffuse through the porous system. After the diffusion of the monomers equilibrated, 0.073 mL of 25% $NH_3$ in water was added to the reaction vessel with a syringe. The reaction was allowed to stir at room temperature under an inert atmosphere for 24 hours. After completion, the powder was recovered using vacuum filtration. The material was activated under vacuum at 125° C. for 17 hours before nitrogen adsorption and standard characterization.

Synthesis of Fe-BTC/PDHAA 2,5-Dihydroxy-1,4-benzenediacetic acid and anhydrous solvents were bought from Sigma Aldrich without further purification. 0.250 g of Fe-BTC was activated at 150° C. under vacuum overnight in a 100 mL 2-neck round bottom flask and schlenk line and an oil pump. After activation, the sample was allowed to cool to room temperature and then N2 was flowed over the sample. 0.0893 g of 2,5-dihydroxy-1,4-benzenediacetic acid was added to 50 mL of ethanol in a nitrogen purged glove box. Using a steel cannula, and $N_2$, the ethanol/2,5-dihydroxy-1,4-benzenediacetic acid solution was transferred to the reaction flask containing Fe-BTC. The orange powder turned dark purple indicative of polymerization. The reaction was allowed to stir for 24 hours at room temperature under an inert atmosphere. After completion, the reaction mixture was filtered under vacuum. Once dry the sample was placed in a vacuum oven and heated at 125° C. over night. The material was activated under vacuum at 125° C. for 17 hours before nitrogen adsorption and standard characterization.

Synthesis of Cu-BTC

Cu-BTC can be made using a $Cu^{2+}$ salt and trimesic acid. In order to do that, the two compounds are added together in a water ethanol mixture. The material can precipitate out through the addition of base or by heating the solution. The result is a blue powder and is purified using a soxhlet extractor with ethanol as the solvent. The material is highly crystalline and has a surface area up to 2000 $m^2/g$.

Synthesis of Cu-TDPAT

Cu-TDPAT is a copper-containing MOF where copper is linked by TDPAT ligands (where TDPAT=deprotonated 2,4,6-tris(3,5-dicarboxylphenylamino)-1,3,5-triazine).

Since TDPAT is not commercially available, it has to be synthesized, for example by using the following procedures.

In a 250 mL round bottom flask, mix together 7.6 g of 5-aminoisophthalic acid acid, 2.68 g of NaOH, 4.37 g of $NaHCO_3$ and 70 mL of $H_2O$.

Cool the mixture to 0° C. using an ice bath and add drop wise 1.84 g of cyanuric chloride in 35 mL of 1,4-dioxane with an addition funnel.

Heat the mixture to 100° C. under reflux for 24 hours.

Once cooled to room temperature, adjust the pH to pH −2 with HCl.

Recover the resulting solid by vacuum filtration and wash it with distilled water and hot methanol. The resulting solid is a dried powder. It is pure $H_6TDPAT$ ((2,4,6-tris (3,5-dicarboxylphenylamino)-1,3,5-triazine)) which is subsequently used for the synthesis of Cu-TDPAT.

In a 100 mL bottle, mix together 30 mL of dimethylamine, 30 mL dimethylsulfoxide, 13.5 mL $HBF_4$ and 1.5 mL $H_2O$.

After, add 2.46 g of $Cu(NO_3)_2 \cdot H_2O$ and 0.45 g of $H_6TDPAT$ to the mixture. Place the bottle in a Thermo Scientific Heratherm oven and heat to 85° C. for 72 hours.

After completion of the reaction, purify the resulting solid with methanol using a soxhlet apparatus for 24 hours.

Dry the sample under vacuum and then heat to 125° C. before standard characterization.

Synthesis of Al-BDC-$NH_2$

Al-BDC-$NH_2$ is a MOF containing $Al^{3+}$ that are linked together by BDC-$NH_2$ ligands (where BDC-$NH_2$ is deprotonated 2,amino terepthalic acid). It can be synthesized as follows.

In a 250 mL round bottom flask, dissolve completely 544 mg of 2-aminoterephthalic acid in 120 mL of dimethylformamide.

Stir the solution at 420 rpm and heat to 110° C.

Divide 1.45 g of $AlCl_3 \cdot 6H_2O$ into 6 equal portions and add two portions to the heated mixture every 15 minutes.

Stir the mixture for 3 hours and then turn off the stirring for another 16 hours.

After completion of the reaction, filter the resulting yellow powder was and underwent soxhlet extraction with ethanol for 24 hours.

Dry the sample under vacuum and heat at 125° C. before standard characterization.

Material and Methods

Inductive Coupled Plasma Optical Emission Spectroscopy

Precious metal salts and standards were bought from Sigma Aldrich and used without further purification. Precious metals were simulated at different concentrations in water obtained from a millipore purification system and also from the Rhone river (Sion, Switzerland, Latitude: 46.228332, Longitude: 7.369975). The precious metal concentrations were measured using an Agilent 5110 Synchronous Vertical Dual View ICP-OES. Before ICP analysis, all samples, including the standards, controls, and treated water solutions were first filtered using a 25 mm hydrophilic PTFE membrane syringe filter with 0.22 μm pores to remove any solid and then the remaining solutions were treated with $HNO_3$ or HCl, to create a 2%, 3% and 5% acidic solutions. Five wavelengths were chosen for analysis and averaged.

Batch Precious Metal Removal Experiments

Fe-BTC and the composites mentioned above removal capacities were evaluated at low concentrations (1 ppm) and at higher concentrations (>60 ppm). Aqueous solutions of $Au^{3+}(AuCl_3)$, $Pd^{2+}(Pd(NO_3)_2$ and $Ag^+(Ag(NO_3))$ were prepared using millipore water and water from the Rhone river (Sion, Switzerland, Latitude: 46.228332, Longitude: 7.369975). About 10 mg of Fe-BTC or the composites were added to 20 mL of the solution and the vials were placed in a Thermo Scientific MaxQ4450 Orbital Shaker for 24 hours at 400 rpms and held at a constant temperature of 30° C. The samples were filtered using a 25 mm hydrophilic PTFE membrane syringe filter with 0.22 μm pores to remove any solids and elemental analysis was carried out on the remaining aqueous media after acidification.

The invention claimed is:

1. A method for extraction of compounds comprising one or more metal or metalloid from an aerial or aqueous medium by selective binding, said method comprising:
providing an aerial or aqueous medium comprising compounds comprising one or more metal or metalloid;
exposing said aerial or aqueous medium to a composite, said composite comprising at least one porous template functionalized by at least one polymer, said polymer comprising one of the following chemical functions: primary, secondary or tertiary amine, amide, nitrile, pyridine, pyrrole, thiol, thioether, thiophene, thiadiazole, alcohol/hydroxyl, phenol, catechol, pyragallol, carboxylic acid, aldehyde, ester, acyl, crown ether, phosphate, phosphoryl, epoxide, halogen, haloalkane;
during said exposure, allowing the compounds comprising one or more metal or metalloid to bind to the composite.

2. The method according to claim 1, wherein said at least one polymer is chosen among redox active polymers, peptides, biopolymer comprising polypeptides and polysaccharides, epoxy based polymer, fluoropolymer, acrylics, dedrimers, rubbers, inorganic polymers and organic polymers.

3. The method according to claim 2, wherein said at least one polymer is chosen among redox active polymers.

4. The method according to claim 3, wherein said redox active polymer is chosen among Poly(Tetracyanoquinodimethane) (PTCNQ), Poly(Viologens) Poly(Tetrathiafulvalene) (PTTF), Quinone Polymers, Polyhydroquinone (PHQ), Polydopamine (PDA), Polytyramine (PTA), Poly-para-phenylediamine (PpPDA), Poly(Vinylferrocene) (PVF or PVFc) (Organometallic Redox Polymer), Perfluorinated Sulfonic Acids (Nafion®), Poly(Styrene Sulfonate) (PSS), Poly(4-vinylpyridine) (PVP, QPVP), Polyaniline (PANI) and PANI Derivatives, Poly(1-aminoanthracene), Poly(o-toluidine), Poly(1,8-diaminonaphthalene) (PDAN), Poly (aniline-co-N-propanesulfonic acid-aniline), Poly(Diphenylamine) (PDPA), Poly(2-Aminodiphenylamine) (P2ADPA), Poly(o-Phenylenediamine) (PPDA), Poly(o-Aminophenol) (POAP), Polyluminol (PL), Polypyrrole (PP) and PP Derivatives, Polyindole and Derivatives, Polymelatonin (PM), Polyindoline, Polycarbazoles (PCz), Polythiophene (PT) and PT Derivatives, Polyazines, Poly(1-Hydroxyphenazine) (PPhOH), Poly(Acridine Red) (PAR), Poly (Phenosafranin) (PPhS), Polyflavin (PFl), Poly(New Fuchsin) (PnF), Polyfluorene (PF), Poly(9-Fluorenone) (PFO), Poly (9,10-Dihydrophenanthrene), Poly(p-Phenylene) (PPP), Poly(Phenylenevinylene) (PPPV), Polytriphenylamine (PTPA), Poly(4-Vinyl-Triphenylamine) (PVTPA), Polyrhodanine (PRh), Poly (Eriochrome Black T), Poly(5-Amino-1,4-Naphthoquinone) (PANQ), Poly(5-Amino-1-Naphthol), Poly(4-Ferrocenylmethylidene-4H-Cyclopenta-[2,1-b;3,4-b°]-Dithiophene), Fullerene-Functionalized Poly(Terthiophenes) (PTTh-BB), Poly[Iron(4-(2-Pyrrol-1-Ylethyl)-4°-Methyl-2,2°-Bipyridine)$_3^{2+}$], Polypyrrole Functionalized by $Ru(bpy)(CO)_2$, Poly(Tetra-Substituted Porphyrins), Poly(Tetra-Substituted Phtalocyanines), Poly[4,4°(5°)-Bis(3,4-Ethylenedioxy)Thien-2-Yl] Tetrathiafulvalene (PEDOT-TTF), Poly {3-[7-Oxa-8-(4-Tetrathiafulvalenyl) Octyl]-2,2°-Bithiophene} (PT-TTF), Poly (Aniline-co-Diaminodiphenyl Sulfone), Poly(Aniline-co-2/3-Amino or 2,5-Diamino Benzenesulfonic Acid), Poly (Aniline-co-o-Aminophenol), Poly(m-Toluidine-co-o-Phenylenediamine), Poly (Luminol-Aniline), polymer of 2,5-dihydroxy-1,4-benzenediacetic acid (PDHAA), poly-para-phenylenediamine (PpPDA) and polyhydroquinone (PHQ), preferably among polydopamine (PDA), poly-para-phenylenediamine (PpPDA), polyhydroquinone (PHQ), polymer of 1,4-benzenedithiol (PBDT), polytyramine (PTA) or polymer of 2,5-dihydroxy-1,4-benzenediacetic acid (PDHAA).

5. The method according to claim 1, wherein said at least one porous template comprises at least a metal.

6. The method according to claim 5, wherein said at least one porous template is chosen among a metal-organic framework, a zeolite, carbons, a silica, an aerogel, a covalent organic framework, a porous polymer networks, a porous molecular solid, an hydrogel, a porous boron nitride, a porous graphene and a porous graphene oxide.

7. The method according to claim 6, wherein said at least one porous template is chosen among a metal-organic framework, a zeolite, carbons, a silica, an aerogel, a covalent organic framework, a porous polymer networks, a porous molecular solid and an hydrogel.

8. The method according to claim 7, wherein said at least one porous template is a metal organic framework.

9. The method according to claim 8, wherein said metal organic framework comprises Fe-BTC, Cu-BTC, Cu-TDPAT or Al-BDC-NH$_2$.

10. The method according to claim 1, wherein said one or more metal or metalloid is chosen among: palladium, platinum, ruthenium, iridium, gold, silver, rhodium, cadmium, chromium, lead, mercury, arsenic, barium, radium, selenium, sodium, radioactive (U, Th, Ra, Cs), lithium, magnesium, indium, gallium, germanium, tellurium, bismuth, rhenium, niobium, molybdenum, osmium, lanthanides, iron, cobalt, nickel, copper, zinc.

11. The method according to claim 10, wherein said one or more metal or metalloid is chosen among palladium, platinum, ruthenium, iridium, gold, silver, rhodium, cadmium, chromium, lead, mercury, arsenic, iron, cobalt, nickel and copper.

12. The method according to claim 1, wherein said one or more metalloid is chosen among arsenic, selenium, germanium and tellurium.

13. The method according to claim 9, wherein said metal organic framework comprises Fe-BTC or Cu-BTC.

14. The method according to claim 11, wherein said one or more metal or metalloid is a metal chosen from among palladium, platinum, ruthenium, iridium, gold, silver and rhodium.

15. The method according to claim 1 further comprising removing the composite from the medium after the compounds comprising one or more metal or metalloid have bound to the composite.

16. The method according to claim 15 further comprising regenerating the composite.

17. The method according to claim 16 further comprising exposing the regenerated composite to the aerial or aqueous medium comprising compounds comprising one or more metal or metalloid, or to a second aerial or aqueous medium comprising compounds comprising one or more metal or metalloid.

18. The method according to claim 15 further comprising recovering the compounds from the composite.

19. The method according to claim 1 wherein the binding of the compounds to the composite is selective for a metal or metalloid of interest.

20. The method according to claim 19 the metal or metalloid of interest is a precious metal or metalloid.

* * * * *